(12) United States Patent
Park et al.

(10) Patent No.: US 10,264,312 B2
(45) Date of Patent: Apr. 16, 2019

(54) METHOD FOR CONTROLLING IP-BASED HDMI DEVICE

(71) Applicant: LG ELECTRONICS INC., Seoul (KR)

(72) Inventors: Jangwoong Park, Seoul (KR); Dokyun Kim, Seoul (KR); Hyeonjae Lee, Seoul (KR); Jinkwon Lim, Seoul (KR); Hyunsik Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 16 days.

(21) Appl. No.: 15/532,753

(22) PCT Filed: Dec. 4, 2015

(86) PCT No.: PCT/KR2015/013225
§ 371 (c)(1),
(2) Date: Jun. 2, 2017

(87) PCT Pub. No.: WO2016/089161
PCT Pub. Date: Jun. 9, 2016

(65) Prior Publication Data
US 2018/0007427 A1    Jan. 4, 2018

Related U.S. Application Data

(60) Provisional application No. 62/087,258, filed on Dec. 4, 2014.

(51) Int. Cl.
*G09G 5/00* (2006.01)
*H04N 21/64* (2011.01)
(Continued)

(52) U.S. Cl.
CPC ....... *H04N 21/43635* (2013.01); *G09G 5/006* (2013.01); *H04N 21/422* (2013.01);
(Continued)

(58) Field of Classification Search
CPC ........... H04N 21/43635; H04N 21/422; H04N 21/435; H04N 21/64; H04N 21/64322; H04N 21/8586
See application file for complete search history.

(56) References Cited

U.S. PATENT DOCUMENTS

| | | | |
|---|---|---|---|
| 2008/0271074 A1* | 10/2008 | Bae | H04N 5/44 725/38 |
| 2014/0062679 A1* | 3/2014 | Markov | G08C 17/02 340/12.22 |
| 2014/0359675 A1* | 12/2014 | Mank | H04L 12/2805 725/80 |

FOREIGN PATENT DOCUMENTS

| | | |
|---|---|---|
| KR | 10-2011-0023441 A | 3/2011 |
| KR | 10-2013-0077762 A | 7/2013 |

(Continued)

*Primary Examiner* — Nasser M Goodarzi
*Assistant Examiner* — Adil Ocak
(74) *Attorney, Agent, or Firm* — Birch, Stewart, Kolasch & Birch, LLP

(57) ABSTRACT

A data transmission and reception method for a sink device which is connected to a plurality of source devices by means of a high definition multimedia interface (HDMI), according to an embodiment of the present invention, comprises the steps of: receiving an allocation of an internet protocol (IP) address; transmitting device information about a sink device to a control point through a network; and transmitting service information about a supportable service by the sink device to the control point through the network.

11 Claims, 24 Drawing Sheets

(51) Int. Cl.
*H04N 21/422* (2011.01)
*H04N 21/435* (2011.01)
*H04N 21/436* (2011.01)
*H04N 21/643* (2011.01)
*H04N 21/858* (2011.01)
*H04N 21/4363* (2011.01)

(52) U.S. Cl.
CPC ......... *H04N 21/435* (2013.01); *H04N 21/436* (2013.01); *H04N 21/64* (2013.01); *H04N 21/64322* (2013.01); *H04N 21/8586* (2013.01); *G09G 2370/047* (2013.01); *G09G 2370/06* (2013.01); *G09G 2370/10* (2013.01); *G09G 2370/12* (2013.01); *G09G 2370/20* (2013.01)

(56) References Cited

FOREIGN PATENT DOCUMENTS

| | | |
|---|---|---|
| WO | WO 2012/099378 A2 | 7/2012 |
| WO | WO 2013/172662 A1 | 11/2013 |
| WO | WO 2014/123394 A1 | 8/2014 |

\* cited by examiner

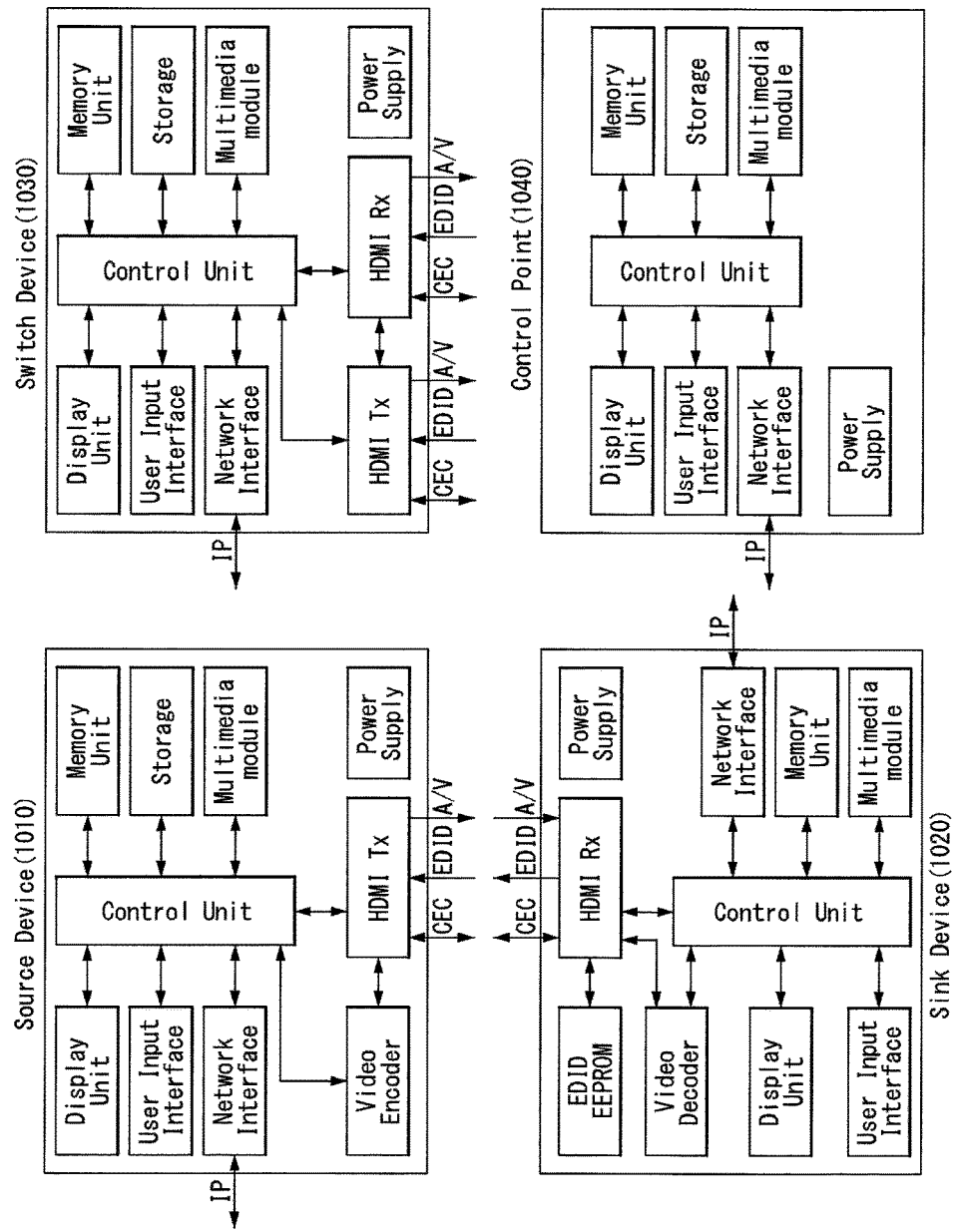
[Fig. 1]

[Fig. 2]
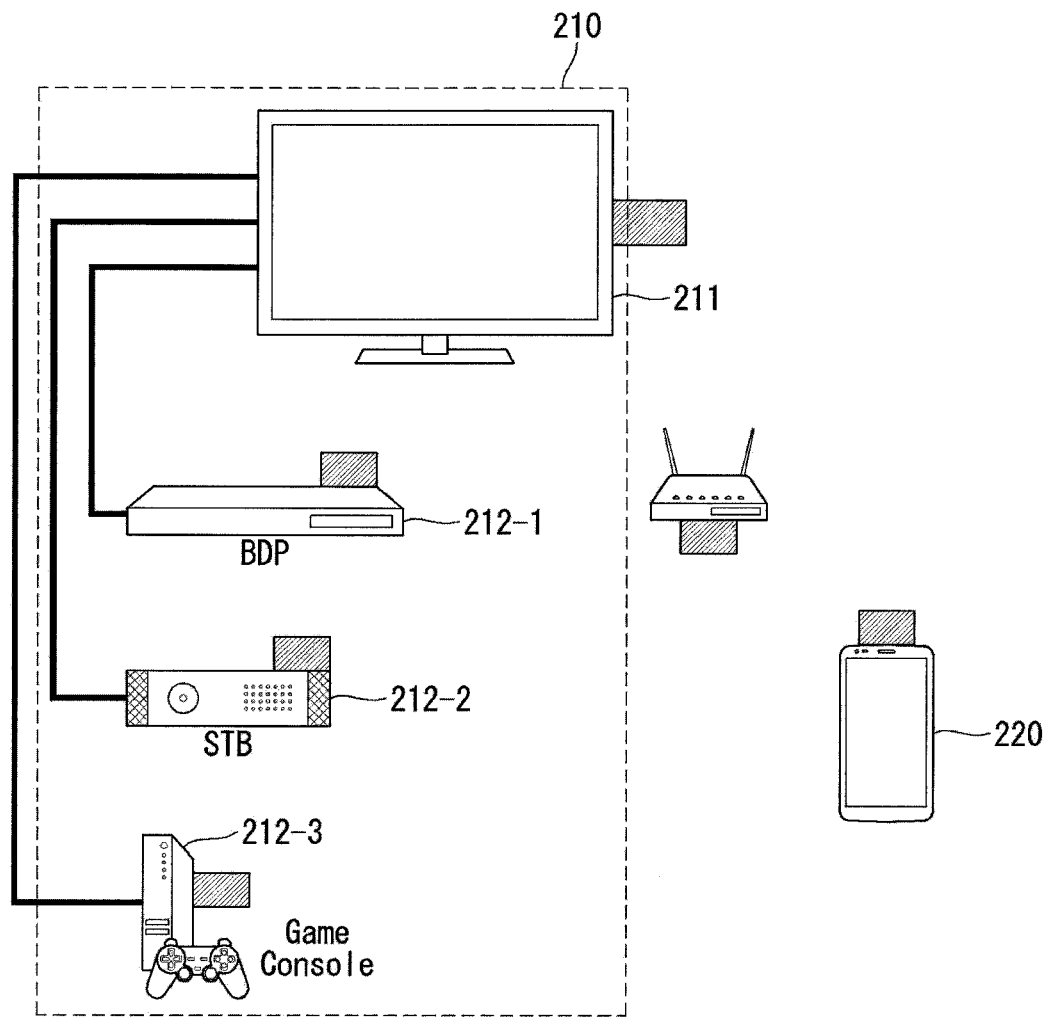

[Fig. 3]
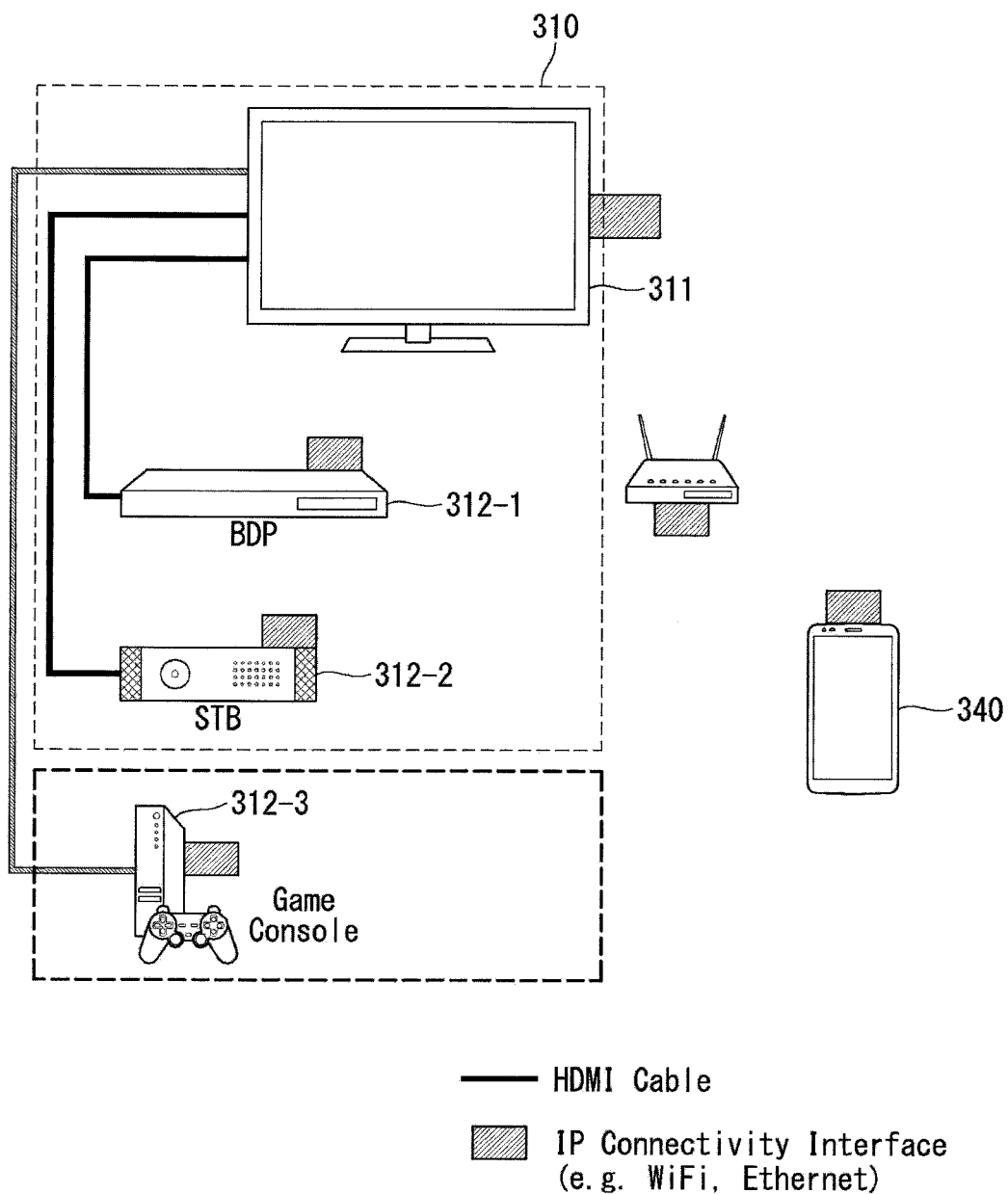

[Fig. 4]
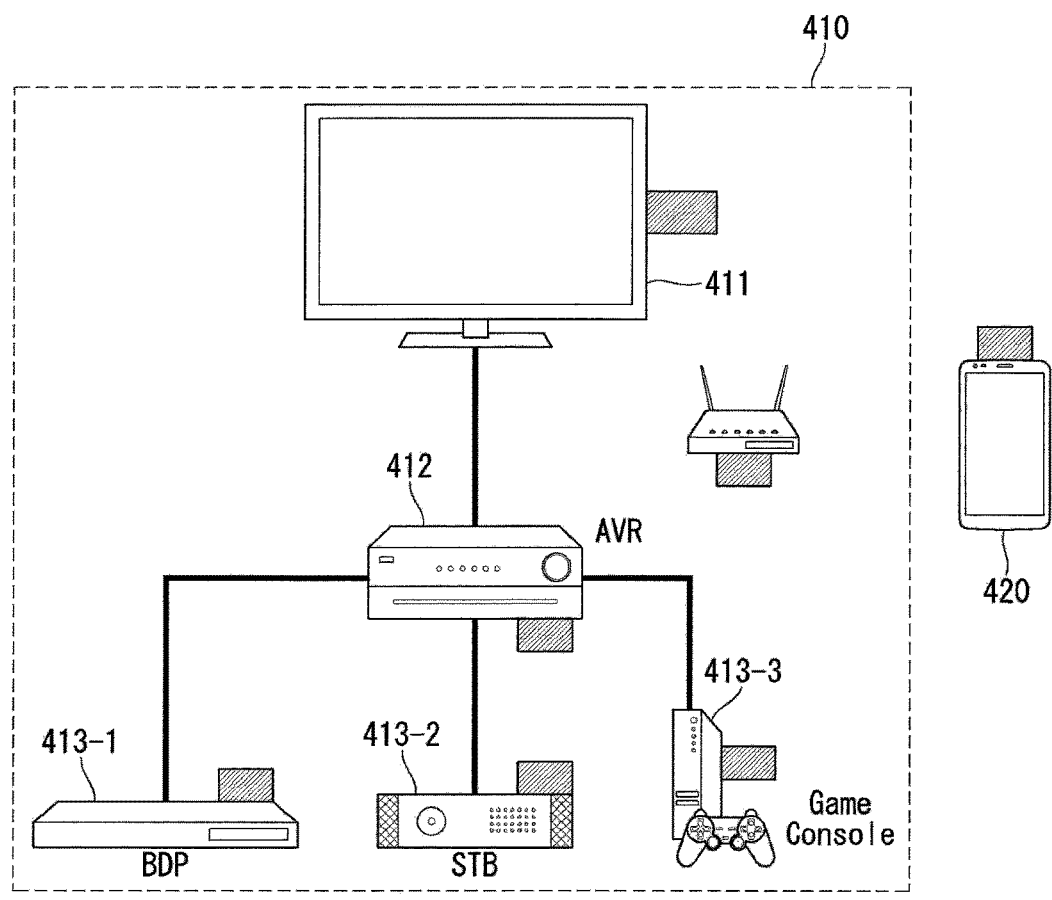

[Fig. 5]
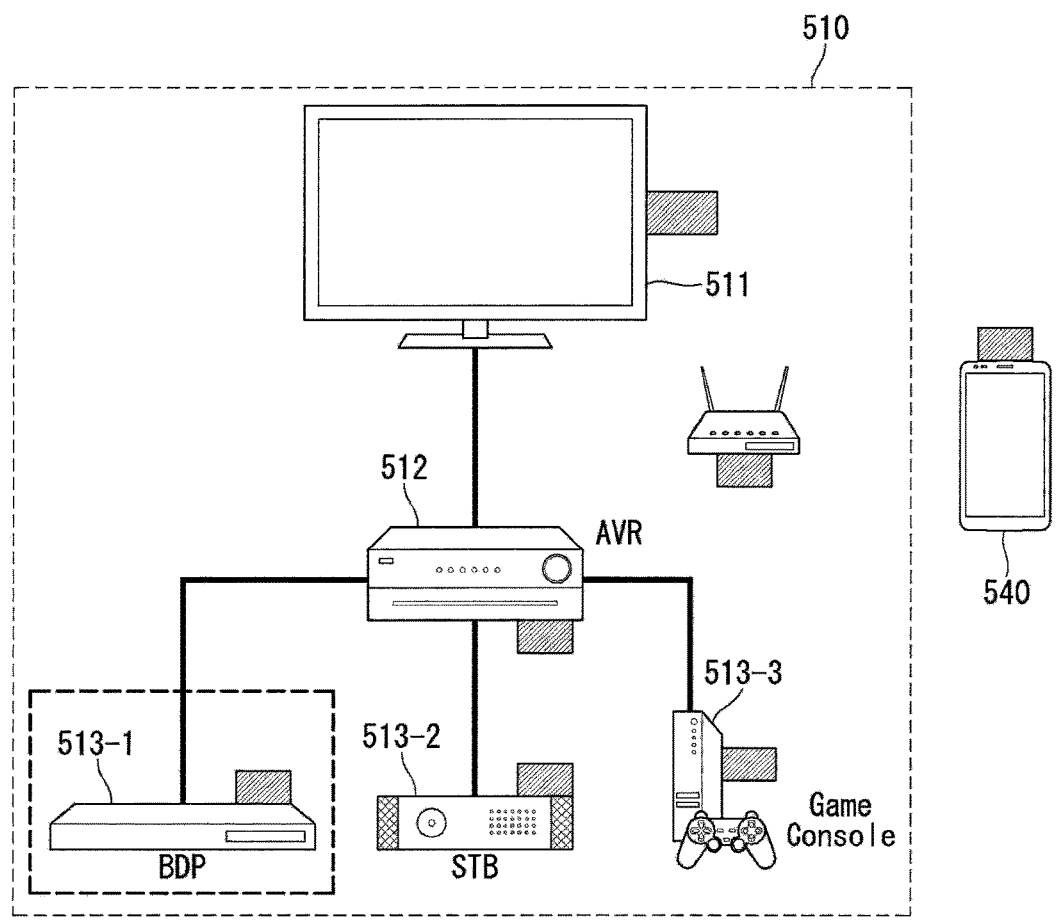

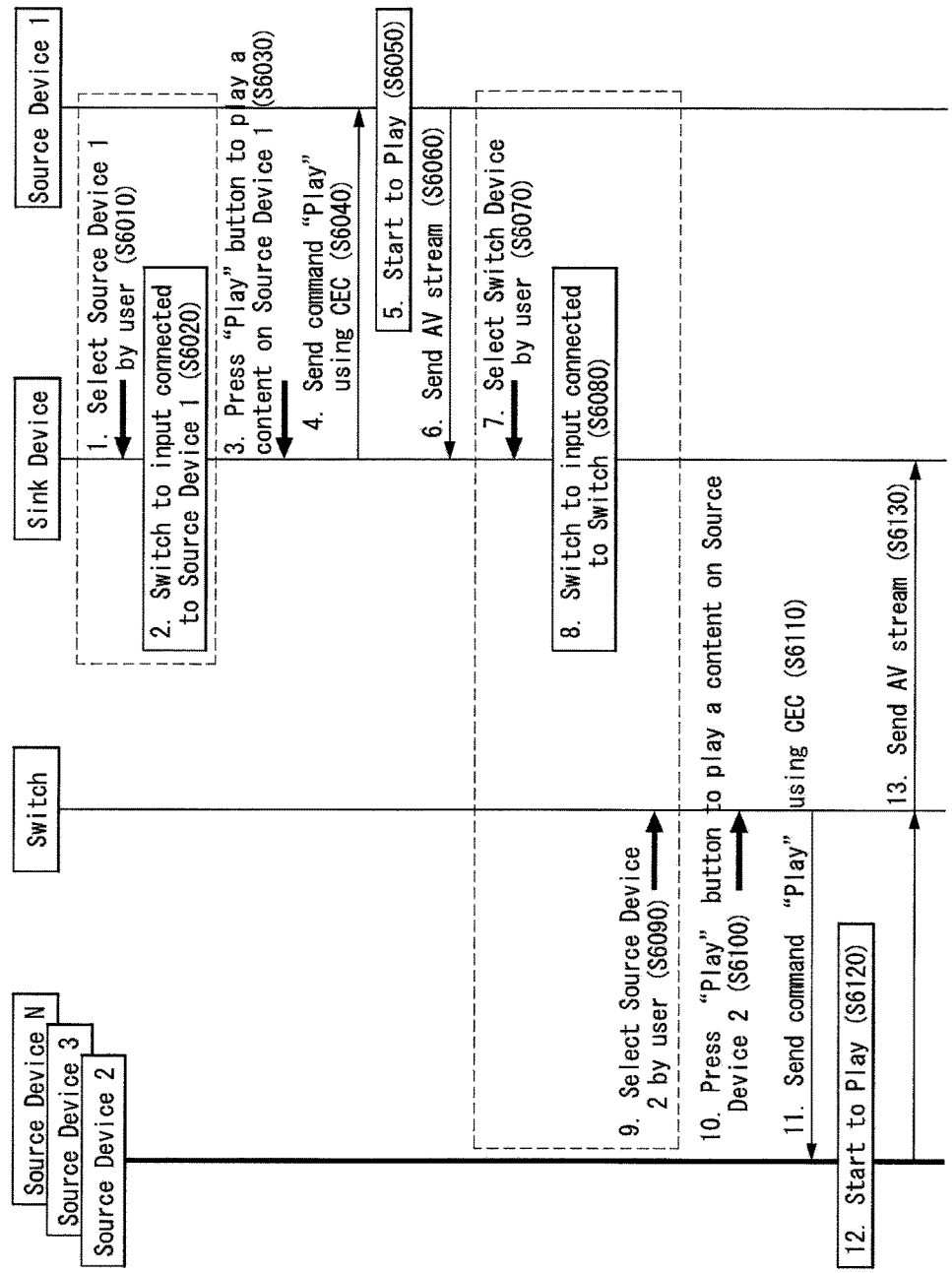
[Fig. 6]

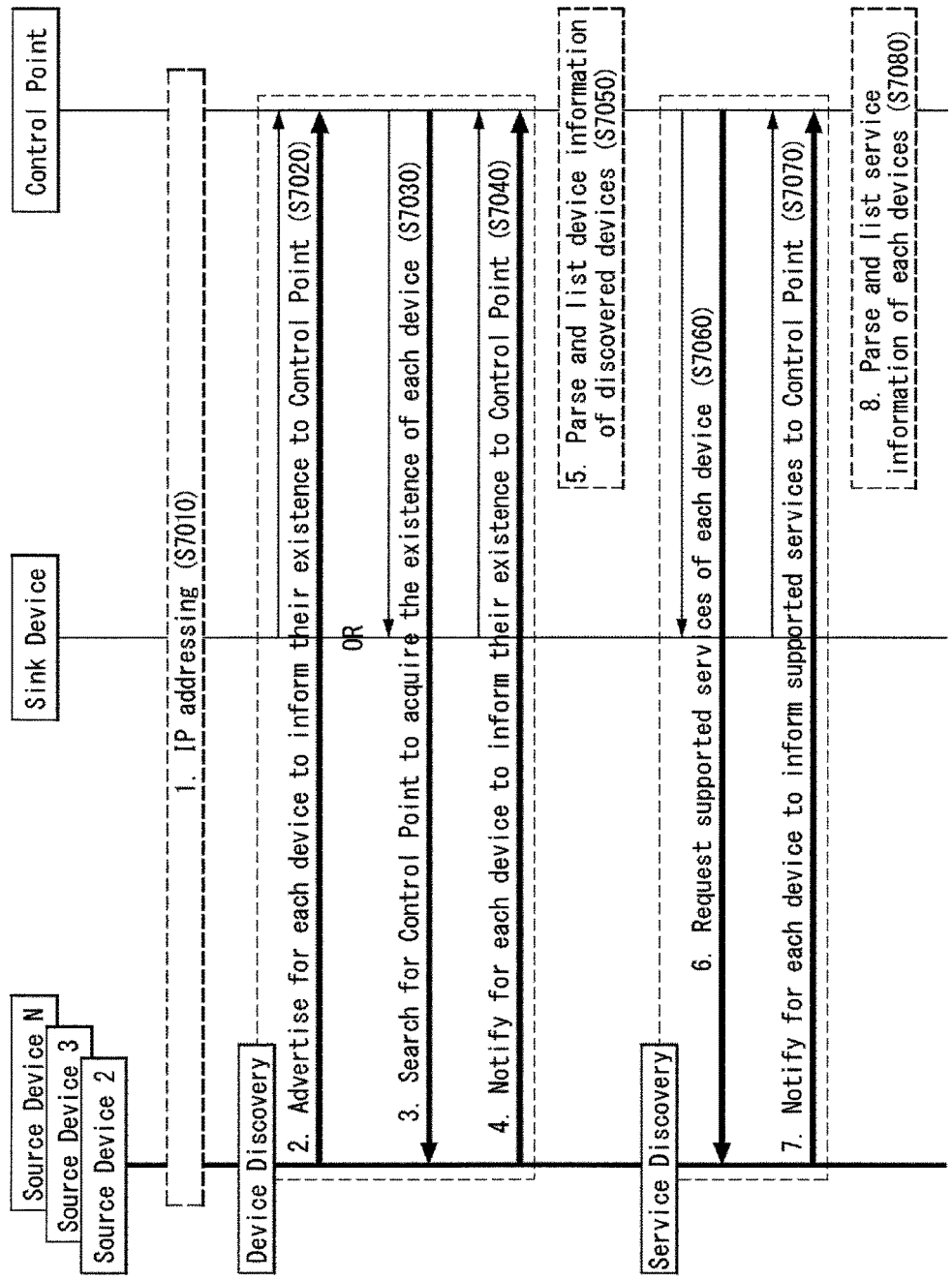
[Fig. 7]

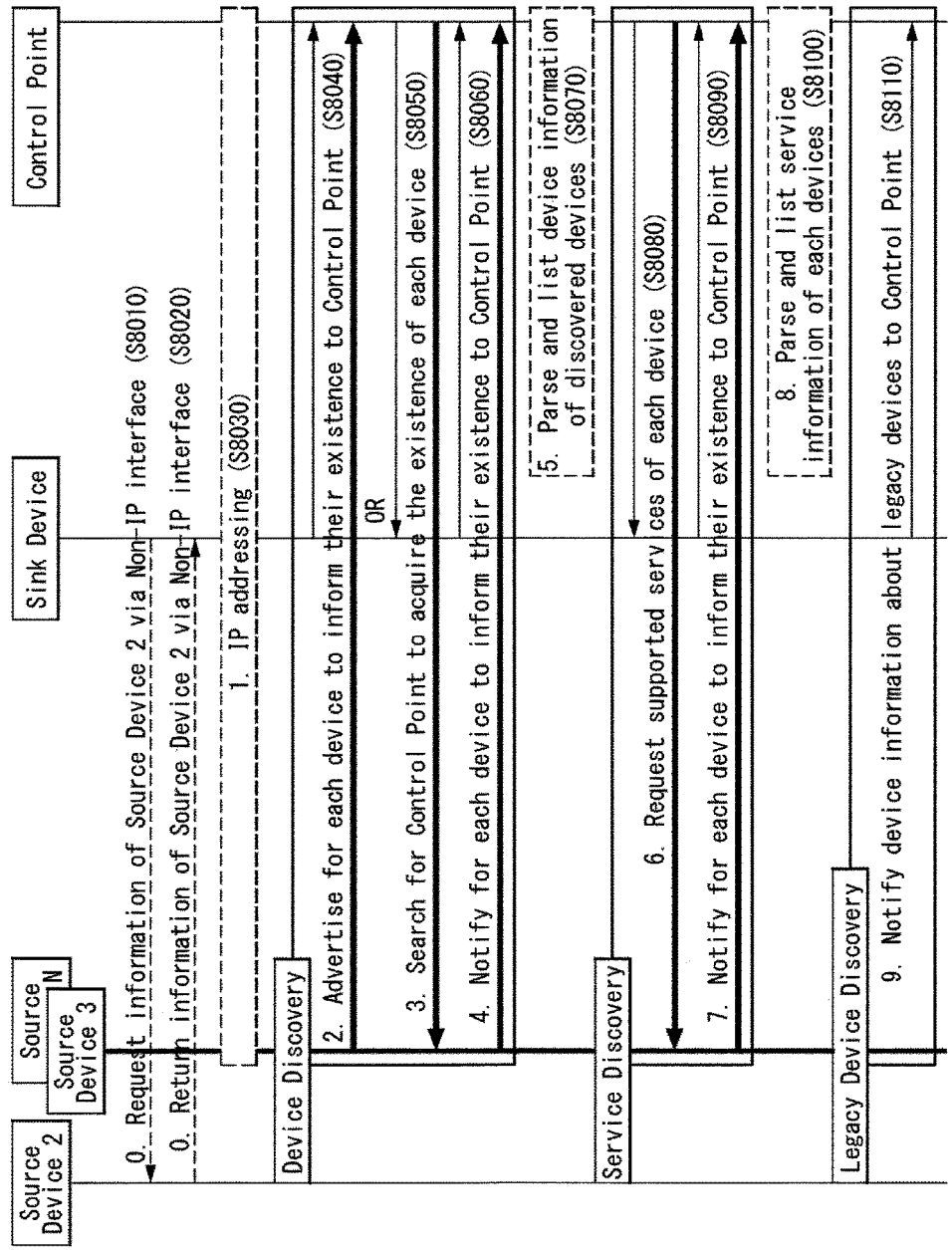
[Fig. 8]

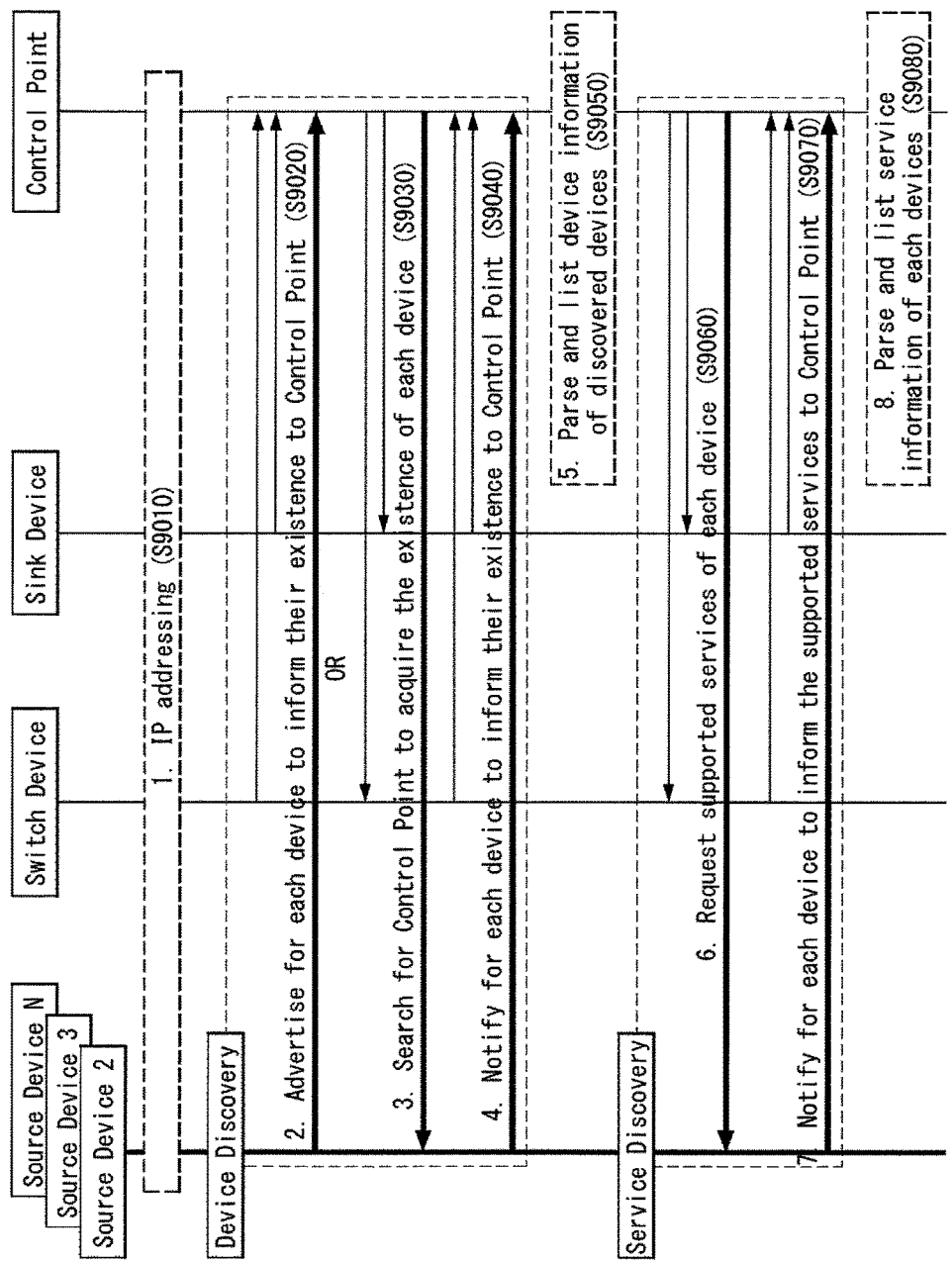

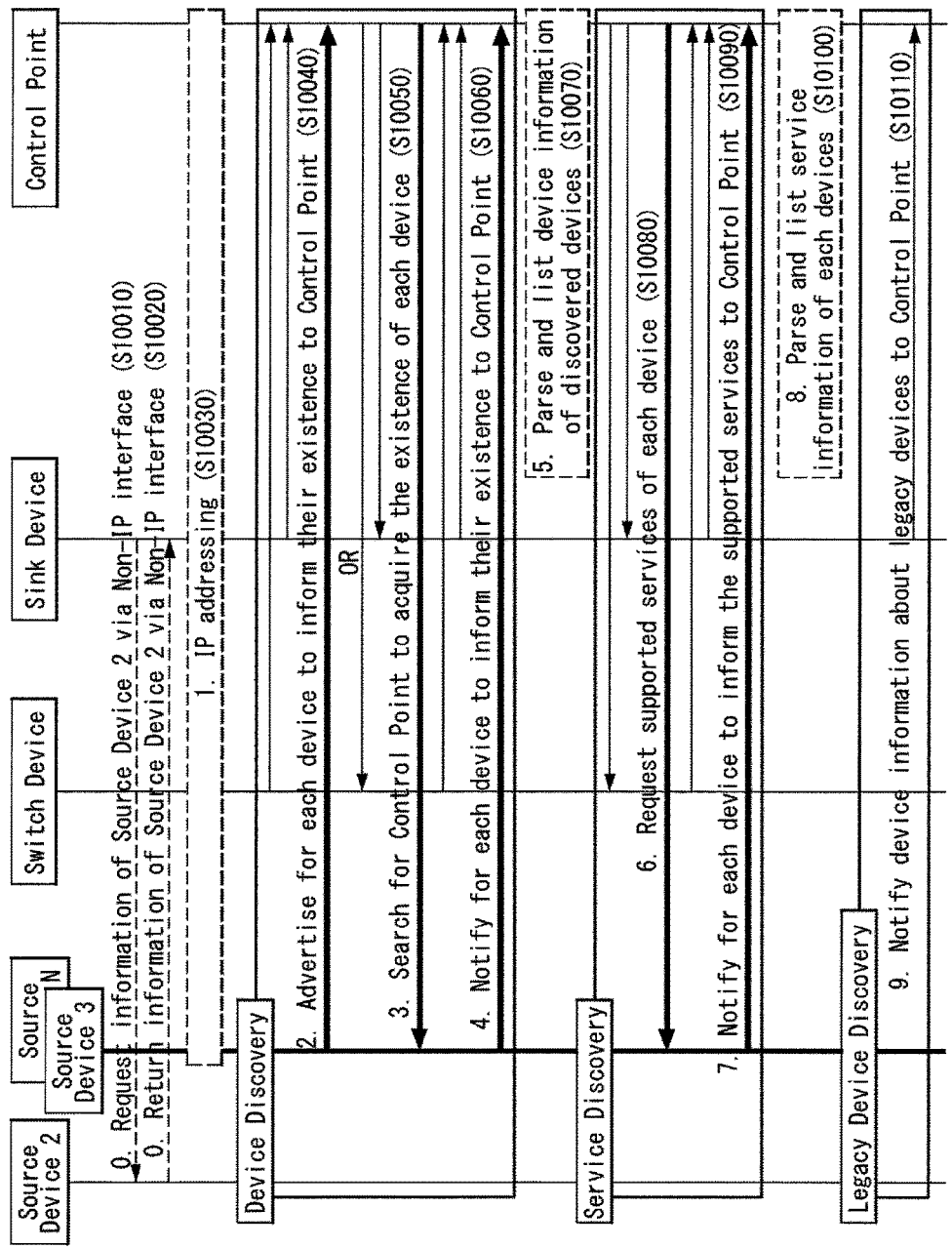
[Fig. 10]

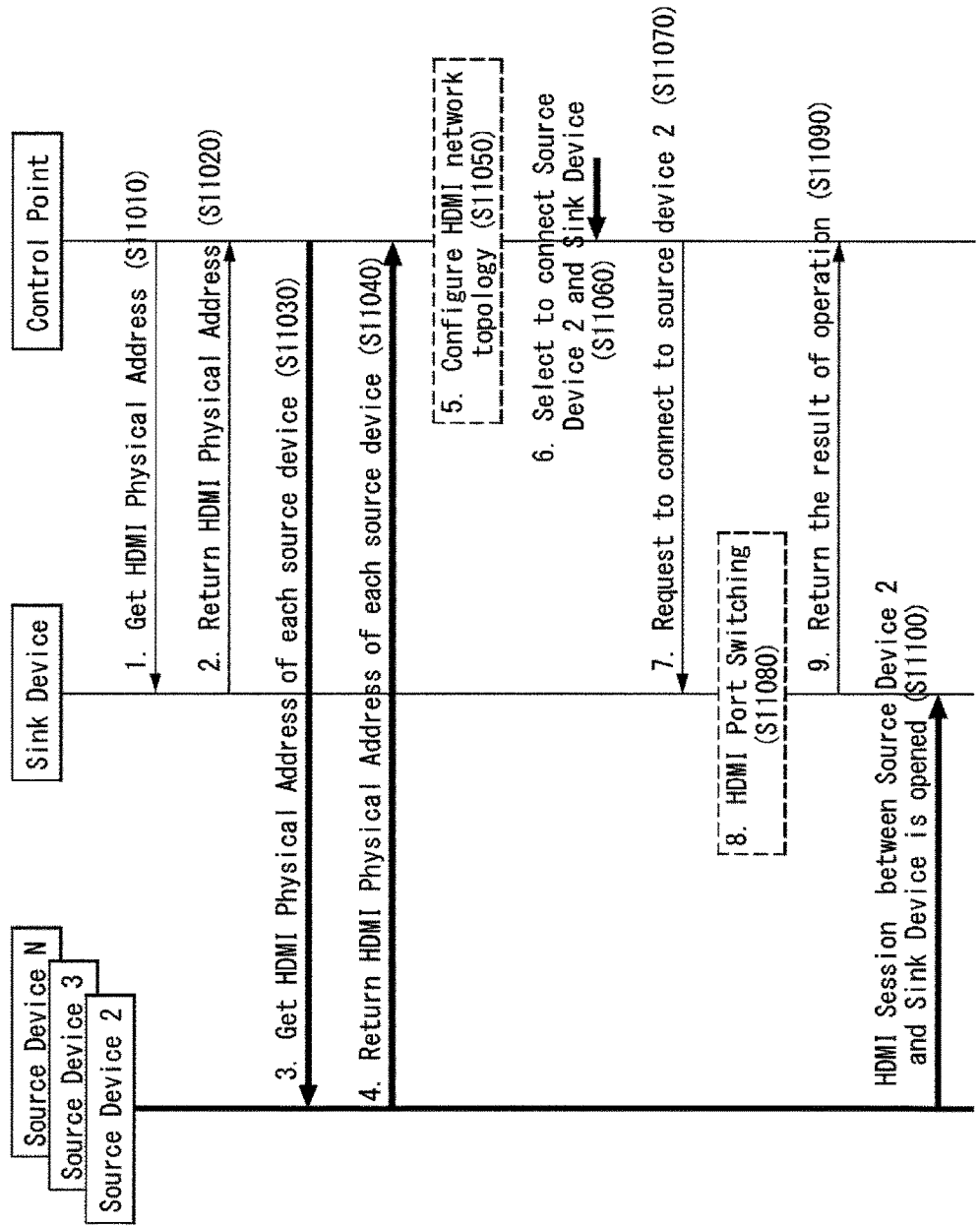

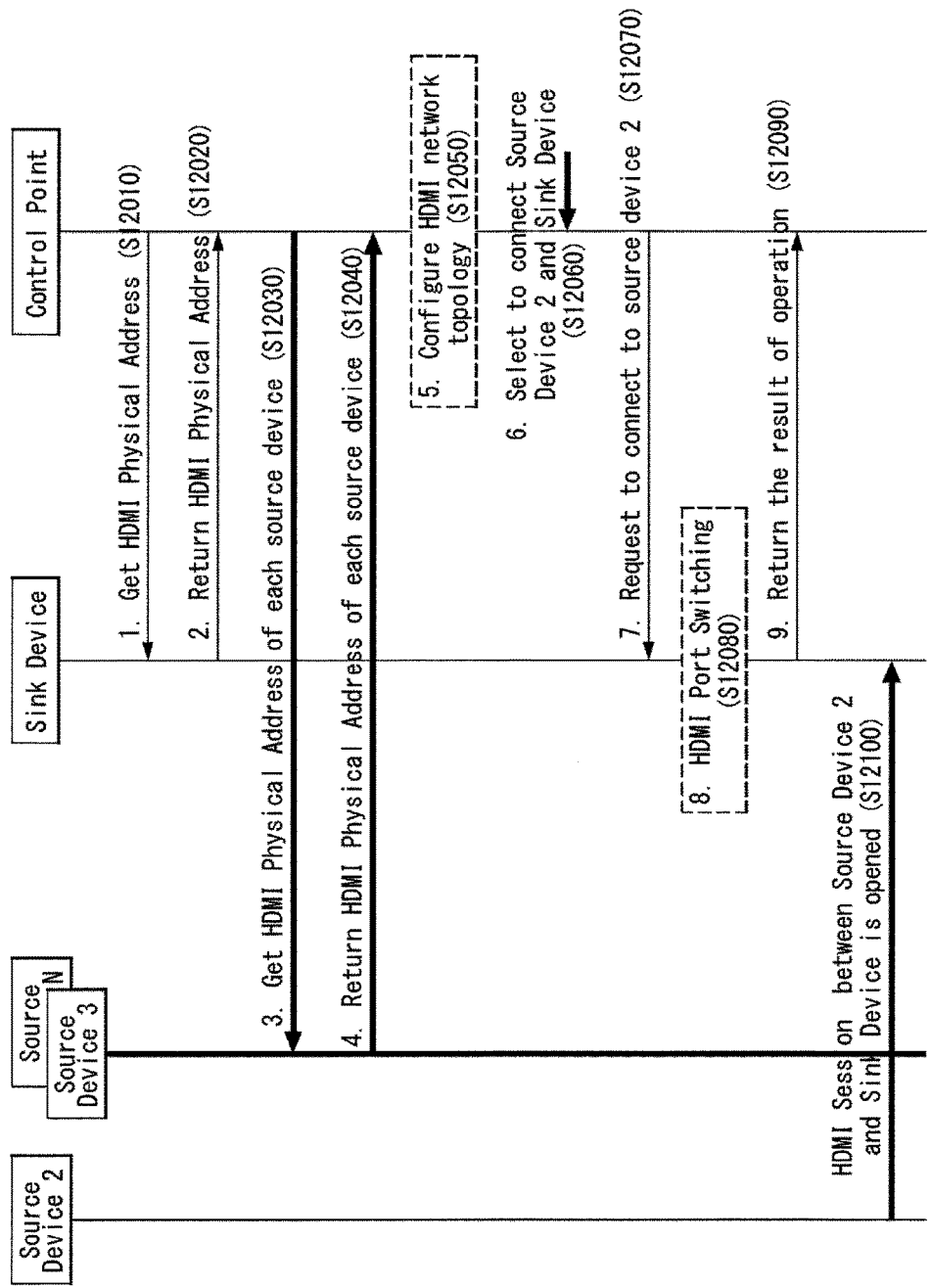
[Fig. 12]

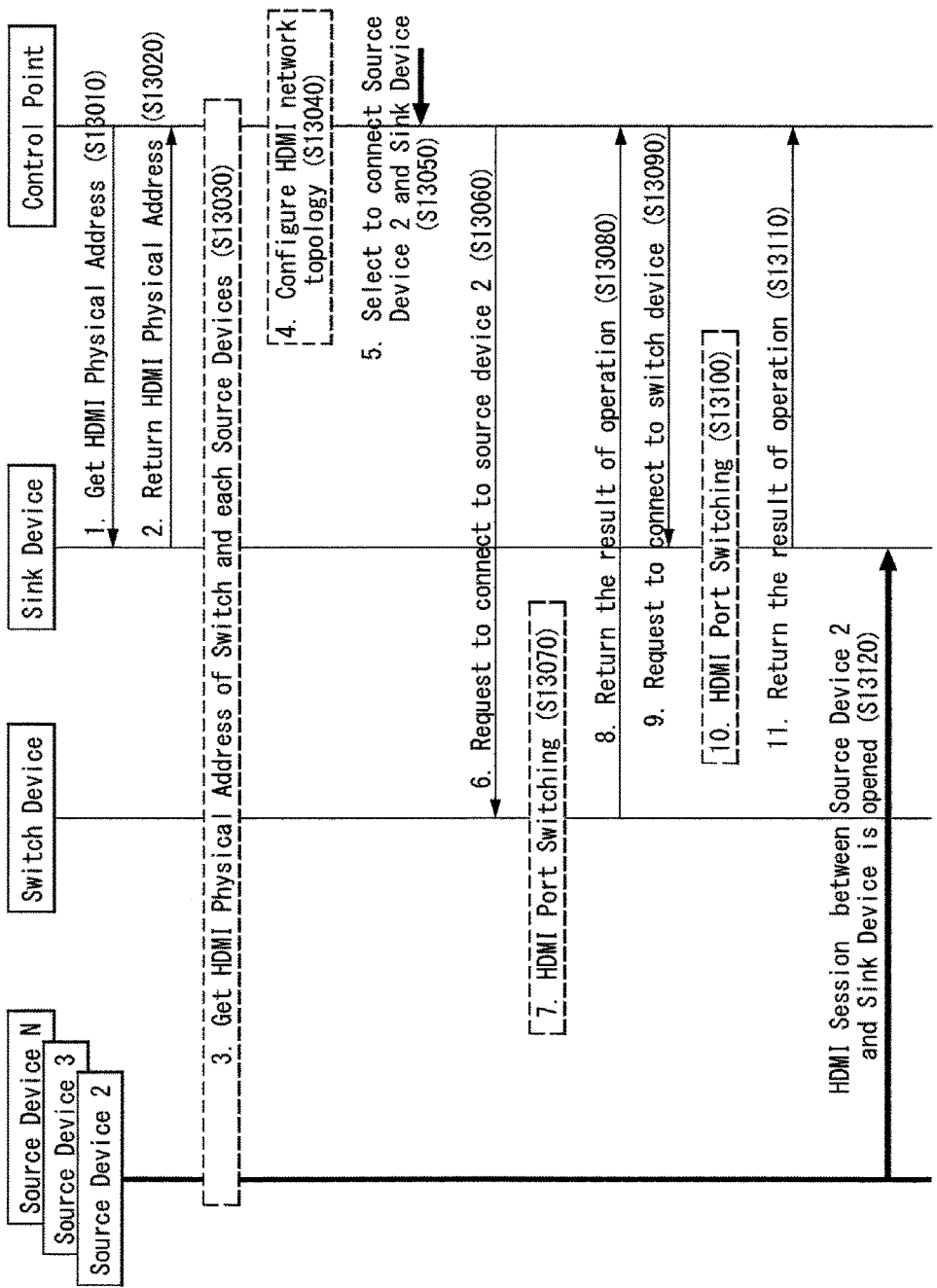

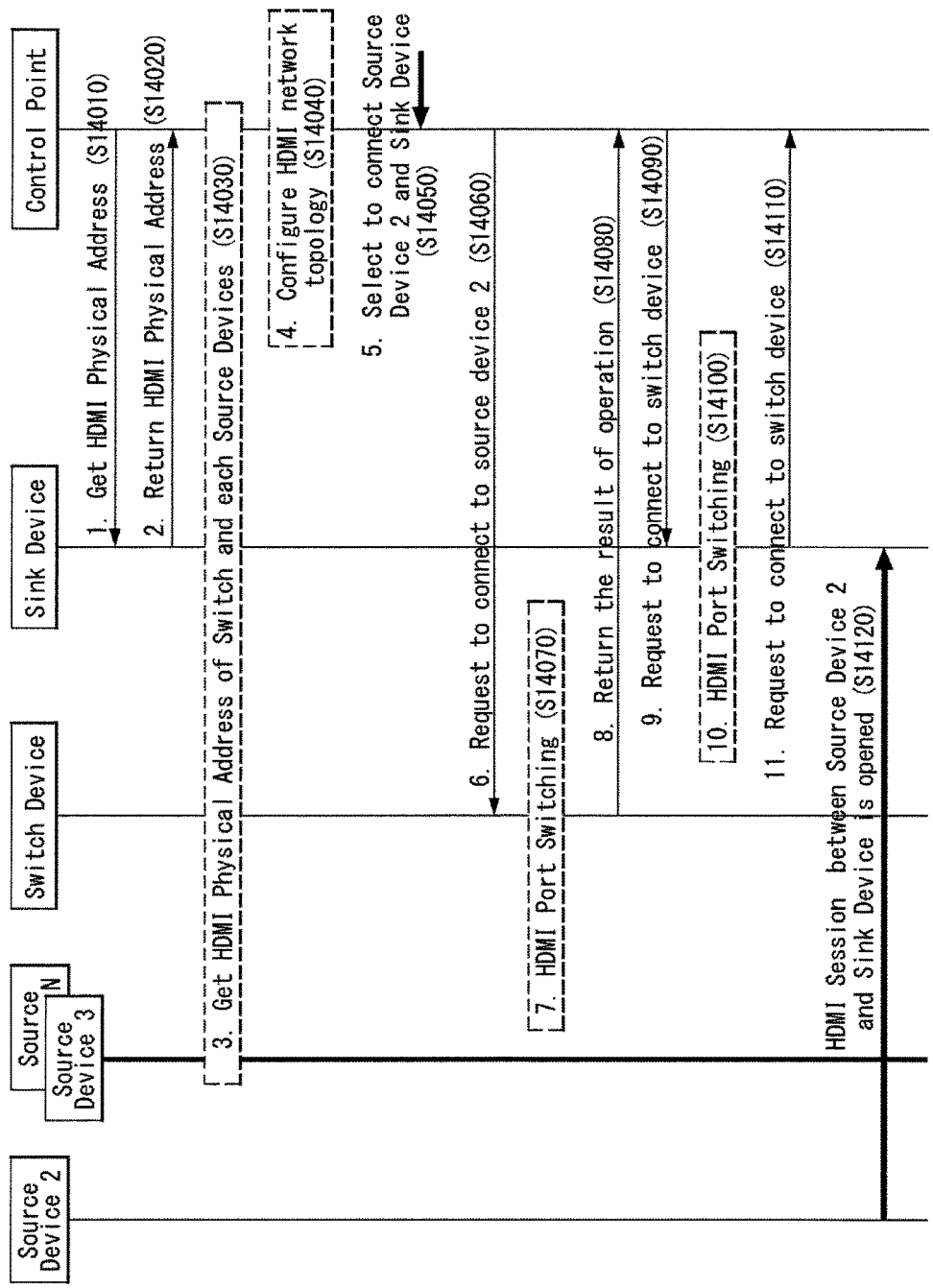

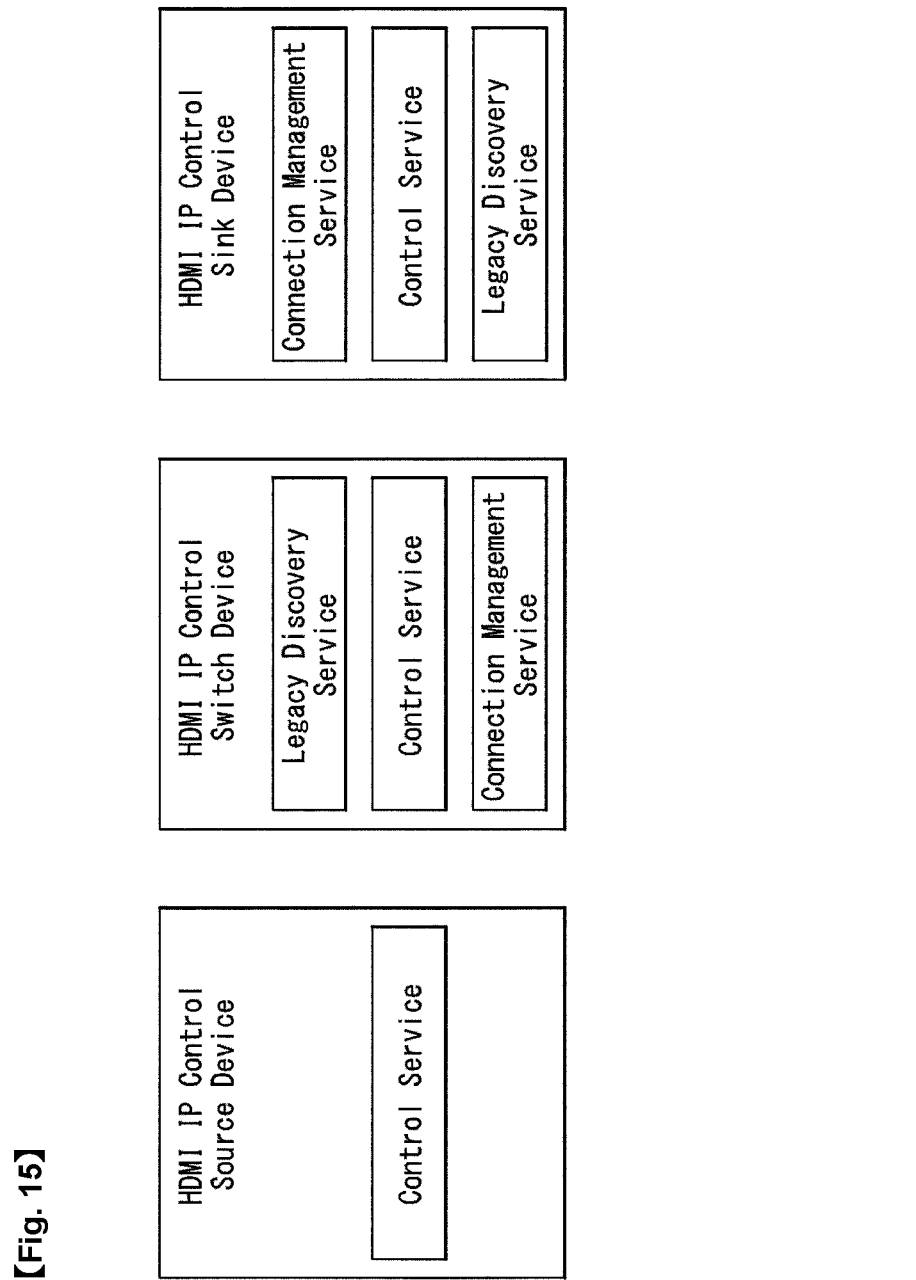
[Fig. 15]

[Fig. 16]

- Actions

| Name | Device R/O | Control Point R/O |
|---|---|---|
| X_HDMI_Get PhysicalAddr () | R | R |
| X_HDMI_ConnectionStart () | R | R |
| X_HDMI_ConnectionStop () | R | R |

- X_HDMIGetPhysicalAddr ()
- Read physical address information assigned to HDMI device

| Argument | Direction | Related State Variable |
|---|---|---|
| HDMIPhysicalAddr | OUT | X_ARG_TYPE_HDMIPhysicalAddr |

- X_HDMIConnectionStart ()
- Request connection to HDMI device to which user is to connect

| Argument | Direction | Related State Variable |
|---|---|---|
| HDMIPhysicalAddr | IN | X_ARG_TYPE_HDMIPhysicalAddr |

- X_HDMIConnectionStop ()
- Request connection release to HDMI device in which user is to release connection

| Argument | Direction | Related State Variable |
|---|---|---|
| HDMIPhysicalAddr | IN | X_ARG_TYPE_HDMIPhysicalAddr |

- State Variables

| Name | R/O | Data Type |
|---|---|---|
| X_ARG_TYPE_HDMIPhysicalAddr | R | ui4 |

- X_ARG_TYPE_HDMIPhysicalAddr
    - Store physical address information assigned to HDMI device

[Fig. 17]

```xml
<?xml version="1.0"?>
<scpd xmlns="urn:schemas-upnp-org:service-1-0" >
  <specVersion>
    <major>1</major>
    <minor>0</minor>
  </specVersion>
  <actionList>
    <action >
      <name>X_HDMI_GetPhysicalAddr</name>
      <argumentList>
        <argument>
          <name>HDMIPhysicalAddr</name>
          <direction>out</direction><modelDescription>
      </argument>
    </argumentList>
  </action >
  <relatedStateVariable>X_ARG_TYPE_HDMIPhysicalAddr</relatedStateVariable>
  </argument>
</argumentList>
</action >
<action >
  <name>X_HDMI_ConnectionStart</name>
  <argumentList>
    <argument>
      <name>HDMIPhysicalAddr</name>
      <direction>in</direction><modelDescription>
    </argument>
    <relatedStateVariable>X_ARG_TYPE_HDMIPhysicalAddr</relatedStateVariable>
    </argument>
  </argumentList>
</action >
<action >
  <name>X_HDMI_ConnectionStop</name>
  <argumentList>
    <argument>
      <name>HDMIPhysicalAddr</name>
      <direction>in</direction><modelDescription>
    </argument>
    <relatedStateVariable>X_ARG_TYPE_HDMIPhysicalAddr</relatedStateVariable>
    </argument>
  </argumentList>
</action >
</actionList>

<serviceStateTable>
  <stateVariable sendEvents="no" >
    <name>X_ARG_TYPE_HDMIPhysicalAddr</name>
    <dataType>ui4</dataType>
    <allowedValueRange>
      <minimum> 0 </minimum>
      <maximum> Vendor defined </maximum>
      <step> 1 </step>
    </allowedValueRange>
  </stateVariable>
</serviceStateTable>
</scpd>
```

[Fig. 18]

```xml
<?xml version="1.0"?>
<root xmlns="urn:schemas-upnp-org:device-1-0">
    <specVersion>
        <major>1</major>
        <minor>0</minor>
    </specVersion>
    <URLBase>base URL for all relative URLs</URLBase>
    <device>
        <deviceType>urn:hdmi-forum-org:device:hdmidevicetype.1</deviceType>
        <friendlyName>short user-friendly title</friendlyName>
        <manufacturer>manufacturer name</manufacturer>
        <manufacturerURL>URL to manufacturer site</manufacturerURL>
        <modelDescription>long user-friendly title</modelDescription>
        <modelName>model name</modelName>
        <modelNumber>model number</modelNumber>
        <modelURL>URL to model site</modelURL>
        <serialNumber>manufacturer's serial number</serialNumber>
        <UDN>uuid:UUID</UDN>
        <UPC>Universal Product Code</UPC>
        <X_HDMI_PortNumber> Number of Port included</X_HDMI_PortNumber>
        <X_HDMI_Version>HDMI Forum spec. version</X_HDMI_Version>
        <X_HDMI_Supported_Feature_List>
            <feature> feature name </feature>
            Description for other features added by UPnP vendor (if any) go here
        </X_HDMI_Supported_Features>
        <iconList>
            <icon>
                <mimetype>image/format</mimetype>
                <width>horizontal pixels</width>
                <height>vertical pixels</height>
                <depth>color depth</depth>
                <url>URL to icon</url>
            </icon>
            XML to declare other icons, if any, go here
        </iconList>
        <serviceList>
            <service>
                <serviceType>urn:hdmi-forum-org:service:ConnectionManagement:1</serviceType>
                <serviceId>urn:hdmi-forum-org:serviceId:ConnectionManagement</serviceId>
                <SCPDURL>URL to service description</SCPDURL>
                <controlURL>URL for control</controlURL>
                <eventSubURL>URL for eventing</eventSubURL>
            </service>
            Descriptions for other services defined by a UPnP Forum working committee (if any) go here
            Description for other services added by UPnP vendor (if any) go here
        </serviceList>
        <deviceList>
            Description of embedded devices defined by a UPnP Forum working committee (if any) go here
            Description of embedded devices added by UPnP vendor (if any) go here
        </deviceList>
        <presentationURL>URL for presentation</presentationURL>
    </device>
</root>
```

[Fig. 19]
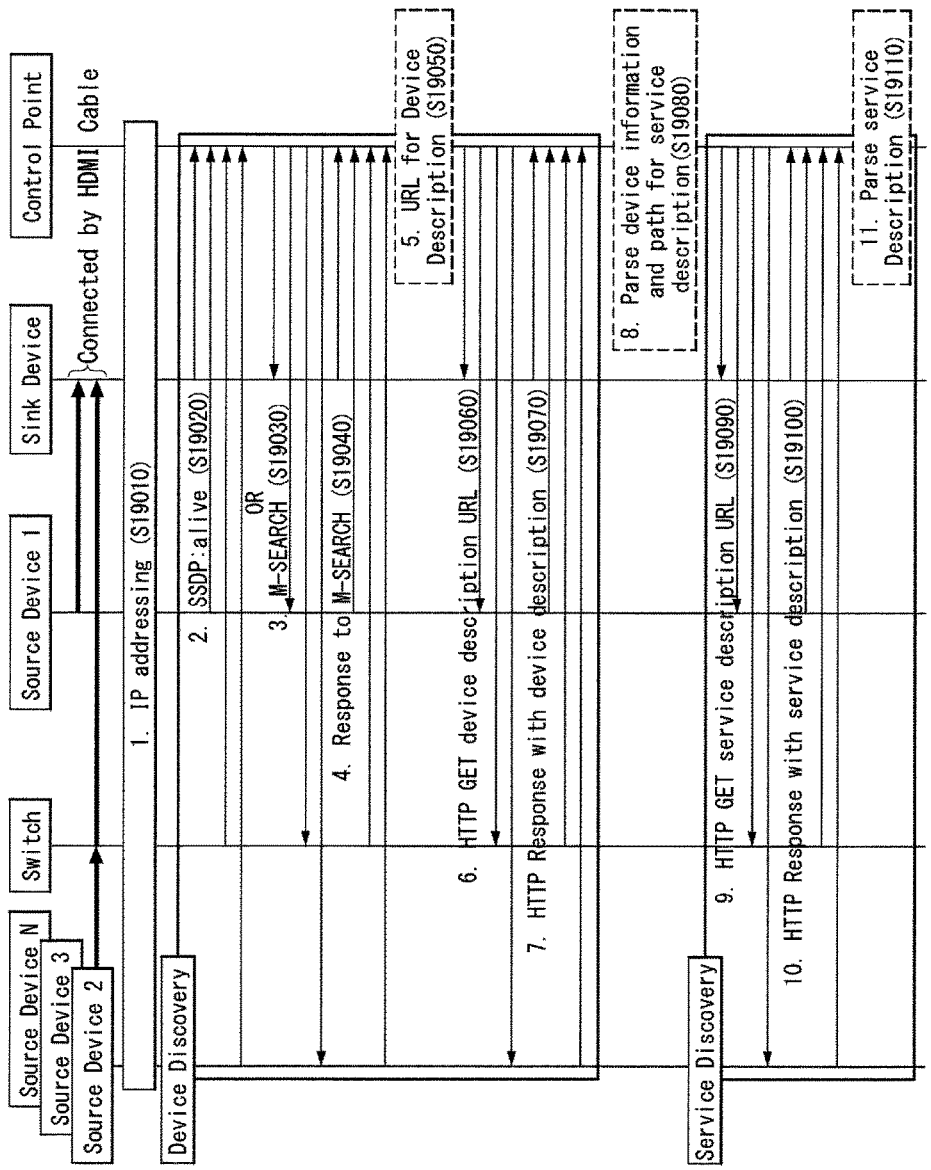

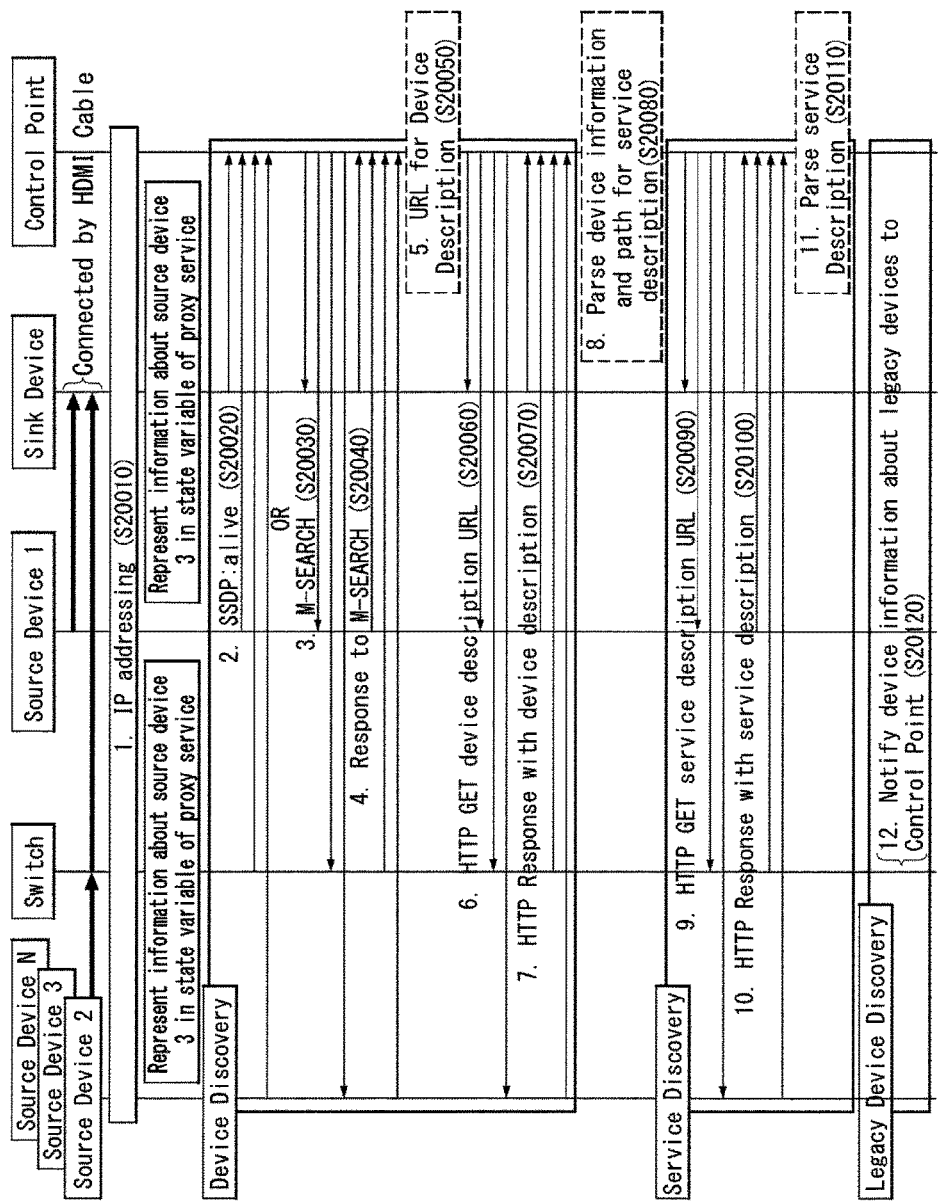
[Fig. 20]

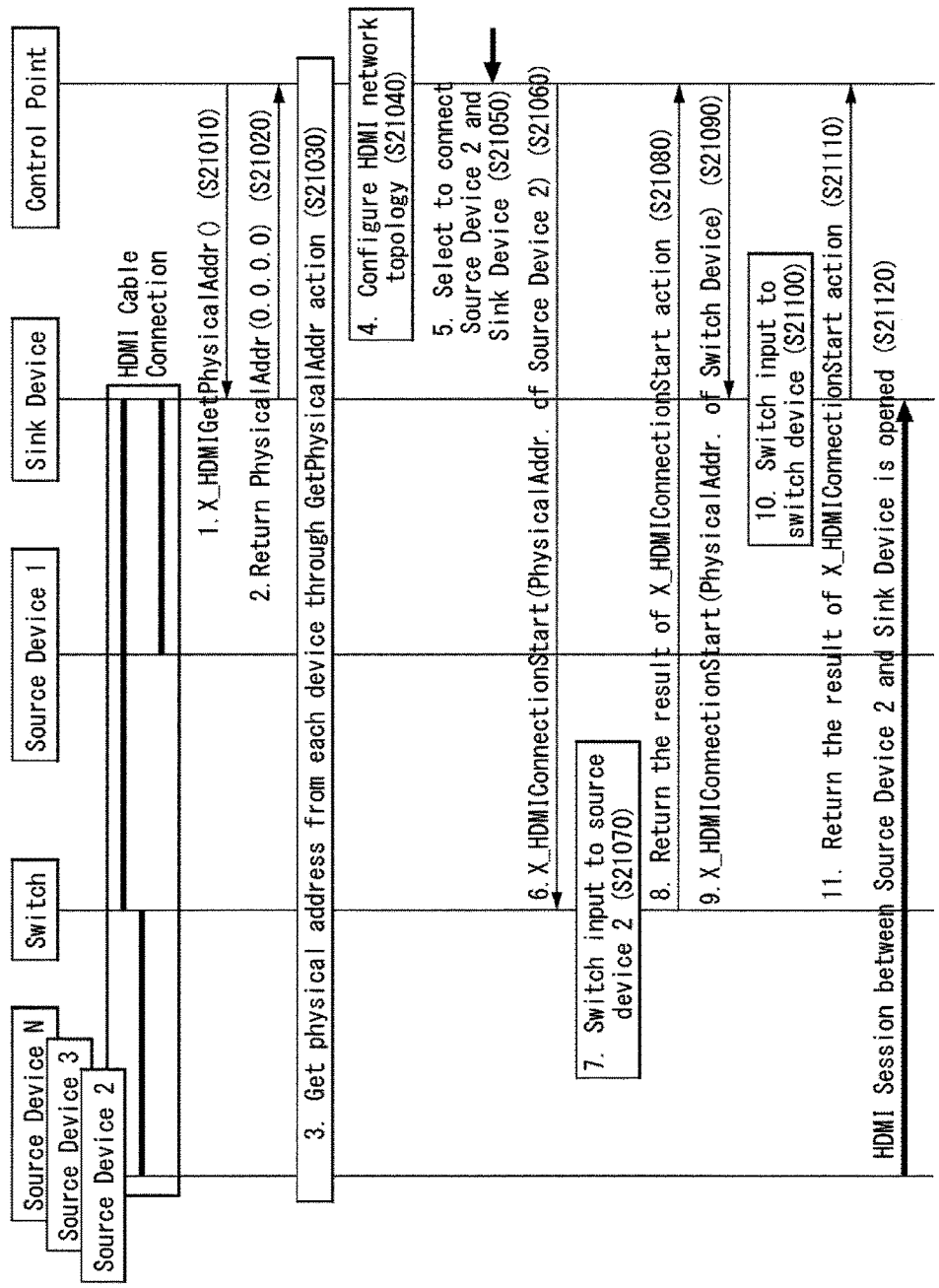
[Fig. 21]

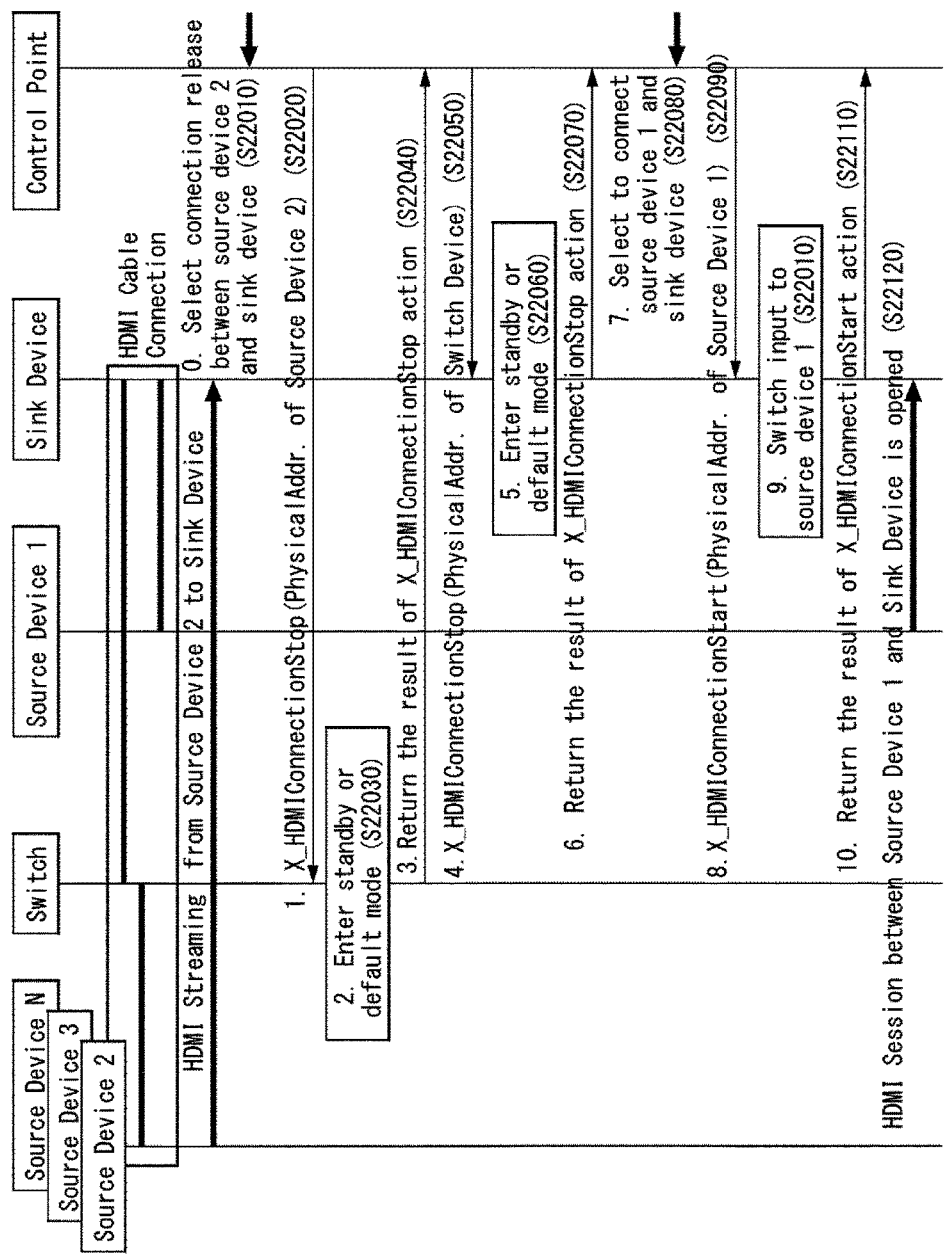

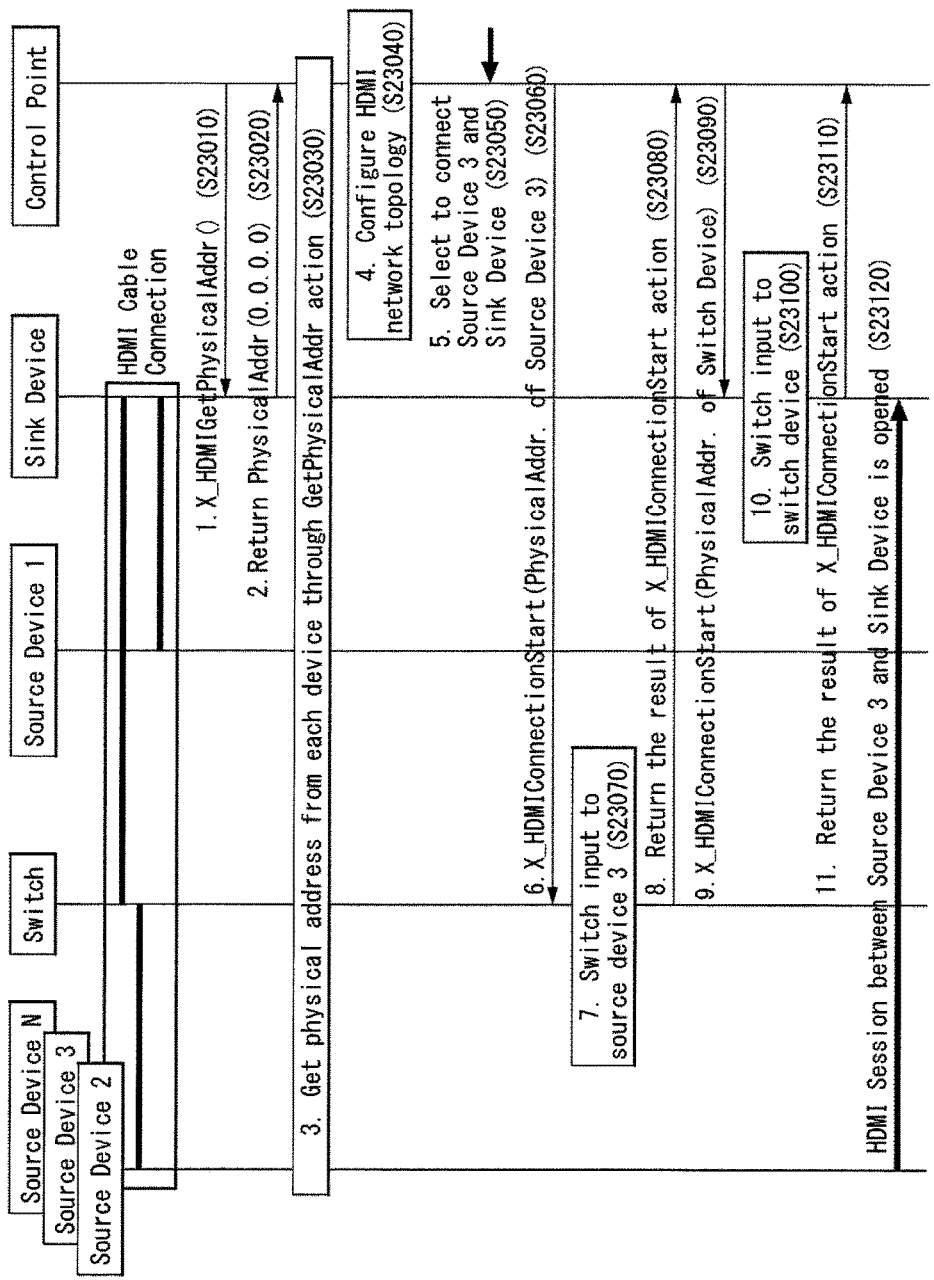

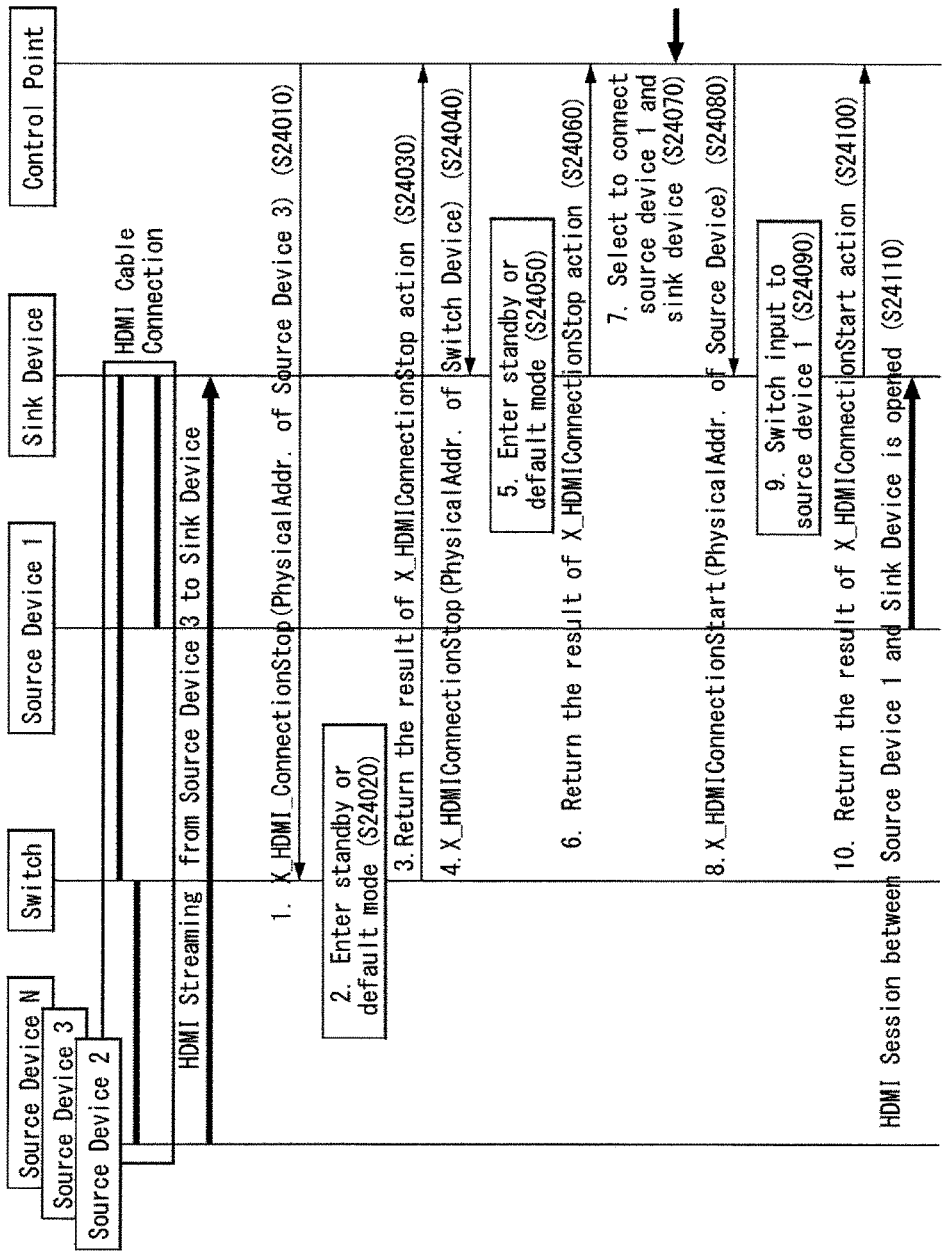
[Fig. 24]

METHOD FOR CONTROLLING IP-BASED HDMI DEVICE

CROSS REFERENCE TO RELATED APPLICATIONS

This application is the National Phase of PCT International Application No. PCT/KR2015/013225, filed on Dec. 4, 2015, which claims priority under 35 U.S.C. 119(e) to U.S. Provisional Application No. 62/087,258, filed on Dec. 4, 2014, all of which are hereby expressly incorporated by reference into the present application.

TECHNICAL FIELD

The present invention relates to a High Definition Multimedia Interface (HDMI) device based on a wireless network and a method of controlling the same.

BACKGROUND ART

Conventionally, in a situation in which a source device, a switch device, and a sink device are connected by a high speed wire interface, in order to view contents of a specific source device in the sink device, a switch process of input ports of the switch device and/or the sink device is required. In this case, when the source device is directly connected to a high speed wire interface device of the sink device, a user switches the input port of the sink device to the input port to which the source device is connected. When the sink device is indirectly connected to the source device through a device (e.g., AVR) that performs a repeater function or the switch device connected to the high speed wire interface device of the sink device, the user should switch an input port of the switch device or the repeater device to an input port to which the source device is connected and switch the input port of the sink device to the input port to which the switch device or the device that performs a repeater function is connected. There is a problem that the user should individually switch the input port of each device.

In order to enhance the problem, in a conventional HDMI system, when the user activates a source device to use, a specific command is transmitted to a sink device through a CEC protocol, and a function of switching to a corresponding input port is provided to the sink device and thus it is unnecessary that the user switches an input port. However, there is a problem that the user should activate a corresponding source device with a remote control and that a separate remote control should be used at every source device, when a plurality of source devices exist. Further, there have been many cases that an input port switch function does not well operate due to instability of a CEC bus.

DISCLOSURE

Technical Problem

The present invention provides a control method of enabling an IP device in which a wireless interface is supported to discover a source device, a switch device, and a sink device connected by a high speed wire interface (or High Definition Multimedia Interface (HDMI) on an Internet Protocol (IP) network and to transmit video and audio from the source device to the sink device through the high speed wire interface.

Technical Solution

In accordance with an aspect of the present invention, a method of transmitting and receiving data of a sink device connected to a plurality of source devices using a High Definition Multimedia Interface (HDMI) includes: receiving allocation of an Internet Protocol (IP) address; transmitting device information about the sink device to a control point through a network; and transmitting service information about a supportable service by the sink device to the control point through the network.

Also, the method of transmitting/receiving data of the sink device may further include, when a first source device of the plurality of source devices cannot be connected to the network, transmitting a request message that requests device information about the first source device and service information about a service in which the first source device can support through the HDMI; and receiving a response message including the device information and the service information of the first source device from the first source device.

Also, the response message including device information and service information of the first source device may be received in a Consumer Electronic Control (CEC) message form.

When the first source device cannot be connected to the network, the transmitting of device information about the sink device may include additionally transmitting device information of the first source device with device information of the sink device to the control point through the network instead of the first source device.

Also, when the first source device cannot be connected to the network, the method the method of transmitting/receiving data of the sink device may further include transmitting service information of the first source device to the control point through the network instead of the first source device.

Also, when the sink device is indirectly connected to the plurality of source devices through the switch device, the switch device may transmit device information and service information of the first source device to the control point through the network instead of a first source device that cannot be accessed to the network among the plurality of source devices.

Also, the method of transmitting/receiving data of the sink device may further include transmitting an HDMI physical address of the sink device to the control point through the network.

Also, when the first source device of the plurality of source devices cannot be connected to the network, the transmitting of an HDMI physical address may include additionally transmitting an HDMI physical address of the first source device with an HDMI physical address of the sink device to the control point through the network instead of the first source device.

Also, the method of transmitting/receiving data of the sink device may further include receiving a connection request to a specific source device of a plurality of source devices from the control point through the network; activating an input port to which the specific source device is connected; and receiving video and/or audio data from the specific source device.

Also, the method of transmitting/receiving data of the sink device may further include receiving a connection release request to the specific source device from the control point through the network; and deactivating an input port to which the specific source device is connected.

Also, when the sink device is indirectly connected to the plurality of source devices through the switch device, the method of transmitting/receiving data of the sink device may further include receiving a connection request to the switch device to which a specific source device of the plurality of source devices is connected from the control point through the network; activating an input port to which the switch device is connected; and receiving video and/or audio data from the specific source device through the switch device.

Also, the method of transmitting/receiving data of the sink device may further include receiving a connection release request to the switch device from the control point through the network; and deactivating an input port to which the switch device is connected.

Also, the device information and service information of the sink device may be transmitted in a Uniform Resource Locator (URL) form in which an Extensible Markup Language (XML) based description document is stored.

Also, in accordance with another aspect of the present invention, a method of transmitting and receiving data of a source device connected to a switch device or a sink device using a High Definition Multimedia Interface (HDMI) includes: receiving allocation of an Internet Protocol (IP) address; transmitting device information about the source device to a control point through a network or to the switch device or the sink device through the HDMI; and transmitting service information about a supportable service by the source device to the control point through the network or to the switch device or the sink device through the HDMI.

Also, in accordance with another aspect of the present invention, a sink device connected to a plurality of source devices using a High Definition Multimedia Interface (HDMI) includes: a HDMI transmission unit that transmits and receives data through the HDMI; a network interface that performs communication with another device; and a control unit that controls the HDMI transmission unit and the network interface, wherein the control unit receives allocation of an Internet Protocol (IP) address, transmits device information about the sink device to a control point through a network, and transmits service information about a service in which the sink device can support to the control point through the network.

Also, the device information and service information of the sink device may be transmitted in a Uniform Resource Locator (URL) form in which an Extensible Markup Language (XML) based description document is stored.

Advantageous Effects

According to an exemplary embodiment of the present invention, because a HDMI device can be manipulated through one device (control point), a user can more simply and easily manipulate HDMI devices, compared with a conventional case that should have individually manipulated the HDMI device. Therefore, user inconvenience can be minimized in manipulating the HDMI devices.

In addition, various effects according to an exemplary embodiment of the present invention will be described in detail hereinafter with reference to the drawings.

BRIEF DESCRIPTION OF THE DRAWINGS

FIG. 1 is a block diagram illustrating an HDMI system according to an exemplary embodiment of the present invention.

FIG. 2 is a diagram illustrating a first exemplary embodiment in which all HDMI devices support a control function based on an IP and in which all source devices are directly connected to a sink device.

FIG. 3 is a diagram illustrating a second exemplary embodiment in which some HDMI devices support a control function based on an IP and in which all source devices are directly connected to a sink device.

FIG. 4 is a diagram illustrating a third exemplary embodiment in which all HDMI devices support a control function based on an IP and in which all source devices are indirectly connected to a sink device through a switch device.

FIG. 5 is a diagram illustrating a fourth exemplary embodiment in which some HDMI devices supports a control function based on an IP and in which all source devices are indirectly connected to a sink device through a switch device.

FIG. 6 is a flowchart illustrating a source device switch action in a conventional HDMI system.

FIG. 7 is a flowchart illustrating a method of searching for HDMI device information of a HDMI system and service information in which a HDMI device provides according to an exemplary embodiment of the present invention.

FIG. 8 is a flowchart illustrating a method of searching for HDMI device information of a HDMI system and service information in which a HDMI device provides according to an exemplary embodiment of the present invention.

FIG. 9 is a flowchart illustrating a method of searching for HDMI device information of a HDMI system and service information in which a HDMI device provides according to an exemplary embodiment of the present invention.

FIG. 10 is a flowchart illustrating a method of searching for HDMI device information of a HDMI system and service information in which a HDMI device provides according to an exemplary embodiment of the present invention.

FIG. 11 is a flowchart illustrating connection and connection release methods between HDMI devices according to an exemplary embodiment of the present invention.

FIG. 12 is a flowchart illustrating connection and connection release methods between HDMI devices according to an exemplary embodiment of the present invention.

FIG. 13 is a flowchart illustrating connection and connection release methods between HDMI devices according to an exemplary embodiment of the present invention.

FIG. 14 is a flowchart illustrating connection and connection release methods between HDMI devices according to an exemplary embodiment of the present invention.

FIG. 15 is a block diagram simply illustrating architecture of a HDMI system.

FIG. 16 is a diagram illustrating actions and state variables in a connection management service.

FIG. 17 is a diagram illustrating an exemplary embodiment of a description XML document of a connection management service defined in FIG. 16.

FIG. 18 is a diagram illustrating an exemplary embodiment of a description XML document of each device transmitted and received at a discovery/search step of a HDMI device.

FIG. 19 is a flowchart illustrating a method of searching for HDMI device information and service information based on UPnP.

FIG. 20 is a flowchart illustrating a method of searching for HDMI device information and service information based on UPnP.

FIG. 21 is a flowchart illustrating a connection method between HDMI devices based on UPnP of the present invention.

FIG. 22 is a flowchart illustrating a connection release method between HDMI devices based on UPnP of the present invention.

FIG. 23 is a flowchart illustrating a connection method between HDMI devices based on UPnP of the present invention.

FIG. 24 is a flowchart illustrating a connection release method between HDMI devices based on UPnP of the present invention.

BEST MODE FOR INVENTION

Although the terms used in the present specification are selected as general terms which are currently used widely as possible while considering functions in the present specification, the terms may be changed according to intentions of those skilled in the art, practices and advents of new techniques. In addition, in a special case, a term is discretionally selected by the applicant. In this case, the meaning of the term will be described in the corresponding embodiment of the detailed description. Accordingly, the terms used in the present specification should be interpreted based on the substantive meanings of the terms and based on the description throughout the present specification, not based on simple nominal terms.

Further, the embodiments will be described in detail by reference to the accompanying drawings and the contents shown in the accompanying drawings, but the present invention is not restricted or limited to the embodiments.

Nowadays, with the launch of a UHD television, in order to provide vivid realism and a sense of immersion to a viewer through the UHD television, UHD contents have been spread through various storage media and services. The viewer may connect an external source device such as a UHD television, a set top box, and a Blueray disk player to a wire video interface such as HDMI and DisplayPort to view UHD contents.

Further, nowadays, a source device and a television have increased that provide various services by accessing to an IP network. However, in a situation in which several source devices are directly connected to the television or are indirectly connected to the television through an AVR, in order to display contents of a source device in which the user is to use on the television, there is inconvenience in which the user should switch an input through a system UI in which the television or the AVR provides. This may be somewhat solved using a control mechanism provided by a wire interface, but in many cases, input switch may slowly and unstably operate and thus there is a drawback that usability is deteriorated.

In order to overcome such a problem, this specification provides a method in which that a mobile device can easily discover and connect a source device, a sink device, and a switch or a device that performs a repeater function through an IP network and thus the viewer can view given contents in an optimal environment. Hereinafter, an exemplary embodiment of the present invention will be described in detail with reference to the accompanying drawings.

FIG. 1 is a block diagram illustrating a High Definition Multimedia Interface (HDMI) system according to an exemplary embodiment of the present invention.

Referring to FIG. 1, the HDMI system may include a source device 1010, a sink device 1020, a switch device 1030, and a control point 1040.

The source device 1010 may send a request message that instructs to the sink device 1020 or may process a command according to a request message received from the sink device 1020. The source device 1010 may send the request message to the sink device 1020, processes a response message received as a response to the request message, and provide the processed message as a User Interface (UI) to the user. In this case, the source device 1010 may support a display device that displays the UI and support a user input interface that receives a user input/command through the UI. The source device 1010 may transmit or stream contents stored at a storage to the sink device 1020.

The sink device 1020 may send a request message that instructs to the source device 1010 or may process a command according to a request message received from the source device 1010. The sink device 1020 may send a request message to the source device 1010, process a response message received as a response to the request message, and provide the processed message as an UI to the user. In this case, the sink device 1020 may support a display device that displays the UI and support a user input interface that receives a user input/command through the user interface. The sink device 1020 may receive contents or streaming from the source device 1010 or may provide contents rendering to the user.

The switch device 1030 may be connected to a plurality of source devices and at least one sink device 1020 to transmit Audio/Video (A/V) data transmitted from a specific source device 1010 to a specific sink device 1020.

The control point may mean various portable electronic devices that can support a wireless/wire network. For example, the control point may mean various portable electronic devices such as a mobile phone, a tablet PC, and a smart watch.

The source device 1010, the sink device 1020, and the switch device 1030 each may include at least one of a network interface, a memory unit, a control unit, a display unit, a multimedia module, a storage, a power supply unit, an Enhanced Extended Display Identification Data (EDID) electrically erasable programmable read-only memory (EEPROM), a video encoder, a video decoder, and a HDMI transmitting/receiving unit (HDMI Tx/Rx).

The network interface may transmit data or a message such as a command, a request, an action, and a response between devices through an IP, mobile communication, and Bluetooth.

The memory unit may be selectively included in the device and may be a volatile physical device (e.g., a memory) in which various kinds of data are temporarily stored.

The control unit (or the processor) may control general actions of the device.

The display unit may display data received through the network interface or data stored at a storage on a screen by the control of the control unit.

The multimedia module may reproduce various kinds of multimedia. The multimedia module may be provided within the control unit or may be provided separately from the control unit.

The storage may be a nonvolatile physical device (e.g., Secure digital (SD) card) that can store various kinds of data.

The power supply unit may receive external power or internal power by the control of the control unit to supply power necessary for an action of each configuration unit (or constituent element).

The EDID EEPROM may be an EEPROM that stores EDID information.

The HDMI transmitting/receiving unit may transmit and receive a CEC message, EDID information, and A/V data through the HDMI.

The video encoder may compress an image to transmit through the HDMI transmission unit.

The video decoder may release compression of a compression image received through the HDMI receive unit.

A block diagram of FIG. 1 is a block diagram according to an exemplary embodiment of the present invention, and separately displayed blocks logically distinguish constituent elements of the device. Therefore, constituent elements of the each device may be mounted as one chip or a plurality of chips according to a design of the device.

FIGS. 2 to 4 are diagrams illustrating a specific situation in order to describe an action of a HDMI system according to an exemplary embodiment of the present invention.

FIG. 2 is a diagram illustrating a first exemplary embodiment in which all HDMI devices support a control function based on an IP and in which all source devices are directly connected to a sink device. In this specification, a HDMI device 210 is included in a HDMI system and may mean a source/sink/switch device that supports a HDMI function.

Referring to FIG. 2, a sink device 211 (e.g., television) may be connected to a plurality of source devices 212-1 to 212-3 (e.g., BDP, STB, Game Console) through a HDMI cable. The sink device 211 and the plurality of source devices 212-1 to 212-3 each include an IP connection interface (e.g., various communication interfaces such as WIFI and Ethernet) to perform IP communication (or TCP/IP communication) with another device (a control point 220). The control point 220 also includes an IP connection interface to perform wired and wireless communication with another device.

The HDMI device 210 may transmit detailed information and state change information of each device with the IP network. Further, the HDMI device 210 may perform a command received from the control point 220.

The control point 220 may perform IP communication with the HDMI device 210 to control the HDMI device 210. For example, the control point 220 may perform IP communication to discover/search for the HDMI device (or contents in which HDMI supports) 210 on a network and to receive detailed information and state change information of each device. Further, the control point 220 may perform IP communication to connect one source device selected by the user among the plurality of source devices 212-1 to 212-3 on an IP network to the sink device 211 (or connect a source device that stores contents selected by the user to the sink device 211) and release connection to the source device connected to the sink device 211. In addition, the control point 220 may control various operations such as play and stop of contents and channel change of the HDMI device 210. A detailed description of such a control operation will be described in detail with reference to a flowchart.

FIG. 3 is a diagram illustrating a second exemplary embodiment in which some HDMI devices support a control function based on an IP and in which all source devices are directly connected to a sink device.

Referring to FIG. 3, a sink device 311 may be connected to a plurality of source devices 312-1 to 312-3 through a HDMI cable. In the present exemplary embodiment, unlike the first exemplary embodiment, a source device (legacy source device) 312-3 of the plurality of source devices 312-1 to 312-3 does not include an IP connection interface. Therefore, in the present exemplary embodiment, the sink device 311 may perform a proxy function so that the sink device 311 can be discovered/controlled by a control point 340 instead of the source device 312-3. In addition, a description on the control point and a HDMI device 310 including an IP connection interface is the same as that described in relation to FIG. 2.

FIG. 4 is a diagram illustrating a third exemplary embodiment in which all HDMI devices support a control function based on an IP and in which all source devices are indirectly connected to a sink device through a switch device.

Referring to FIG. 4, a sink device 411 may be connected to a switch device 412 (e.g., AVR) through a HDMI cable, and the switch device 412 may be connected to a plurality of source devices 413-1 to 413-3 through the HDMI cable. The entire HDMI devices 410 include an IP connection interface to perform IP communication with another device (a control point 420). The control point 420 also includes an IP connection interface to perform IP communication with another device. In addition, a description on the HDMI device 410 and the control point 420 is the same as that described in relation to FIG. 2.

FIG. 5 is a diagram illustrating a fourth exemplary embodiment in which some HDMI devices support a control function based on an IP and in which all source devices are indirectly connected to a sink device through a switch device.

Referring to FIG. 5, a sink device 511 may be connected to a switch device 512 through a HDMI cable, and the switch device 512 may be connected to a plurality of source devices 513-1 to 513-3 through the HDMI cable. In the present exemplary embodiment, unlike the fourth exemplary embodiment, some (legacy source device) 513-1 of the plurality of source devices 513-1 to 513-3 does not include an IP connection interface. Therefore, in the present exemplary embodiment, the sink device 511 may perform a proxy function so that the sink device 511 can be discovered/controlled by a control point 540 instead of the source device 513-1. In addition, a description on the control point 540 and a HDMI device 510 including an IP connection interface is the same as that described in relation to FIG. 2.

FIG. 6 is a flowchart illustrating a source device switch action in a conventional HDMI system. In this flowchart, it is assumed that a first source device is directly connected to a sink device through a HDMI cable and that a second source device to the N-th source device are indirectly connected to the sink device through a switch device. In this case, the second source device to the N-th source device and the switch device, and the switch device and the sink device may be also connected through the HDMI cable.

Referring to FIG. 6, the sink device may receive an user input selecting the first source device (Select Source Device 1 by a user) (S6010). For example, the sink device may provide a list of a plurality of source devices as a user interface to the user, and the user may perform a selection input that selects the first source device for the user interface.

Thereafter, the sink device may switch an input port thereof to an input port connected to the first source device in response to a selection input to the first source device (Switch to input connected to Source Device 1) (S6020). In more detail, when an input port connected to another source device instead of the first source device is activated, the sink device may activate an input port connected to the first source device.

Thereafter, the sink device may receive a user input that plays contents stored at the first source device (Press "Play" button to play a content on Source Device 1) (S6030). For example, in order to play contents stored at the first source device, the user may press a "play" button of a remote control of the sink device, and the sink device may receive a control signal occurring when the play button is pressed.

Thereafter, the sink device may send a content play command to the first source device using a Consumer Electronic Control (CEC) message (Send command "Play" using CEC) (S6040). That is, the sink device may transmit a CEC message that instructs to play contents to the first source device.

Thereafter, the first source device may start to play contents (Start to play) (S6050). In more detail, the first source device may start to play contents according to a command of the received CEC message.

Thereafter, the first source device may send A/V stream to the sink device (Send AV stream)(56060).

Thereafter, the sink device may receive an input that switches an input port thereof to an input port to which the switch device is connected (Select switch device by user) (S6070).

Thereafter, the sink device may switch an input port thereof to an input port to which the switch device is connected according to an input port switch input received at step S6070 (Switch to input connected to Switch) (S6080). That is, when the sink device receives an input port switch input to an input port to which the switch device is connected, the sink device may deactivate the input port to which the first source device is connected and activate the input port to which the switch device is connected.

Thereafter, the switch device may receive a user input that selects the second source device (Select Source Device 2 by user) (S6090). For example, the switch device may provide a list of connected a plurality of source devices as a user interface to the user, and the user may perform a selection input that selects the second source device for the user interface.

Thereafter, the switch device may receive a user input that plays contents stored at the second source device (Press "Play" button to play a content on Source Device 2) (S6100). For example, in order to play contents stored at the second source device, the user may press a "play" button of a remote control of the switch device, and the switch device may receive a control signal occurring when the play button is pressed.

Thereafter, the switch device may transmit a content play command using a CEC message to the second source device. That is, the switch device may send a CEC message that instructs to play contents to the second source device (Send command "Play" using CEC) (S6110).

Thereafter, the second source device may start to play contents (Start to Play) (S6120). In more detail, the second source device may start to play contents according to a command of the received CEC message.

Thereafter, the first source device may send A/V stream to the switch device, and the switch device may send the A/V stream to the sink device (Send AV stream) (S6130).

In the above-described description, at steps S6010-S6020 and S6070-S6090, a problem exists that the user should individually select the source device through an input setup (or switch) UI of each device, and a problem exists that a considerable time is taken for input setup. Hereinafter, a new action of a HDMI system for solving such a problem is suggested.

FIG. 7 is a flowchart illustrating a method of searching for HDMI device information of a HDMI system and service information in which a HDMI device provides according to an exemplary embodiment of the present invention. In this flowchart, a HDMI system action of the above-described first exemplary embodiment will be described in relation to FIG. 2. Further, this flowchart may be classified into a device discovery method (S7020-S7040) and a service discovery method (S7060-S7070).

First, both the control point and HDMI devices (the sink device and a plurality of source devices) may receive an IP address from an Access Point (AP) (IP address allocation (Addressing)) (S7010). In more detail, both the control point and the HDMI devices connected to the same wired and wireless sharer may automatically receive an IPv4 or IPv6 address from a DHCP server.

Thereafter, in order to notify the control point that the HDMI devices are connected to the same network and are available, the HDMI devices advertise (Advertise for each device to inform their existence to Control Point) (S7020). That is, the HDMI devices may perform IP communication to notify the control point of their existence.

Alternatively, instead of step S7020, the control point may directly search for existence of the HDMI devices (Search for Control Point to acquire the existence of each device) (S7030). That is, in order to get existence of the HDMI devices connected to the network, the control point may search for the HDMI devices. In this case, the control point may transmit a search message to the HDMI devices with a broadcasting method.

Thereafter, the HDMI devices connected to the same network may notify the control point of their existence (notify for each device to inform their existence to the control point) (S7040). In this case, at a previous step, in order to notify their existence, the HDMI devices, having received a search message from the control point may transmit a response message to the search message to the control point.

Thereafter, the control point may analyze (or parse) device information of each HDMI device acquired at step S7020 or S7040 and list device information of discovered devices (Parse and list device information of discovered devices) (S7050). For example, the control point may display a list including the discovered devices as a user interface.

Thereafter, in order to determine detailed information about a service that can be supported by each HDMI device acquired at a previous step, the control point may request detailed information about a service that can be supported by each HDMI device to the each HDMI devices (Request supported services of each device) (S7060).

Thereafter, the each HDMI device may transmit detailed information (service information) about a supportable service to the control point as a response message according to the request of the control point at a previous step (Notify for each device to inform supported services to Control Point) (S7070).

Thereafter, the control point may analyze (or parse) service information received from the each HDMI device and list the found service information (Parse and list service information of each devices) (S7080). For example, the control point may display a list of service information in which the found HDMI devices provide as a user interface.

Information and message transmitted and received in this flowchart may be transmitted and received in a Uniform Resource Locator (URL) form in which an Extensible Markup Language (XML) based description document is stored.

FIG. 8 is a flowchart illustrating a method of searching for HDMI device information of a HDMI system and service information in which a HDMI device provides according to an exemplary embodiment of the present invention. In this flowchart, a HDMI system action of the above-described second exemplary embodiment will be described in relation to FIG. 3. Therefore, in this flowchart, the second source device is a legacy HDMI device in which IP communication is unavailable and the sink device instead of the second source device performs a proxy function of the second source device. Further, this flowchart may be classified into a device discovery method (S8040-S8060) and a service discovery method (S8080, S8090, and S8110).

First, the sink device may request detailed information of the second source device that is not connected to an IP network through a non-IP interface (e.g., a HDMI cable) (S8010). Thereafter, the second source device may transmit detailed information thereof (e.g., supportable service information) to the sink device in response to the request of the sink device (S8020). In this case, a request/response transmitted and received between the sink device and the second source device may be transmitted and received as a CEC message through the HDMI cable.

Thereafter, both the control point and HDMI devices (the sink device and the third source device to the N-th source device) that can perform IP communication may receive an IP address from an AP (IP address allocation(Addressing)) (S8030). In more detail, both the control point and the HDMI devices connected to the same wired and wireless sharer may automatically receive an IPv4 or IPv6 address from a DHCP server.

Thereafter, in order to notify the control point that the HDMI devices that can perform IP communication are connected to the same network and are available, the HDMI devices may advertise (Advertise for each device to inform their existence to Control Point) (S8040). That is, the HDMI devices may perform IP communication to notify the control point of their existence. In this case, the sink device may notify the control point of existence of the second source device instead of the second source device as well as existence thereof.

Alternatively, instead of step S8040, the control point may search for existence of HDMI devices that can directly perform IP communication (Search for Control Point to acquire the existence of each device) (S8050). That is, in order to get existence of the HDMI devices connected to the network, the control point may directly search for the HDMI devices. In this case, the control point may transmit a search message to the HDMI devices with a broadcasting method.

Thereafter, the HDMI devices (the sink device and the third source device to the N-th source device) connected to the same network may notify the control point of their existence (Notify for each device to inform their existence to Control Point) (S8060). In this case, at a previous step, in order to notify their existence, the HDMI devices, having received a search message from the control point may transmit a response message to the search message to the control point. Particularly, the sink device may transmit a response message for notifying existence of the second source device as well as existence thereof to the control point.

Thereafter, the control point may analyze (or parse) device information of each HDMI device acquired at step S8040 or S8060 and list device information of discovered devices (Parse and list device information of discovered devices) (S8070). For example, the control point may display a list including the discovered devices as a user interface.

Thereafter, in order to determine detailed information about a service that can be supported by the HDMI devices acquired at a previous step, the control point may request detailed information about a service that can be supported by the HDMI devices to the HDMI devices through an IP network (Request supported services of each device) (S8080).

Thereafter, the HDMI devices that can perform IP communication may transmit detailed information (service information) about a service in which the HDMI devices can support to the control point as a response message according to the request of the control point at a previous step (Notify for each device to inform supported services to Control Point) (S8090). The detailed information about the second source device may be transmitted to the control point by the sink device that performs a proxy function of the second source device and this may be performed at step S8110.

Thereafter, the control point may analyze (or parse) service information received from the HDMI devices that can perform IP communication and list the found service information of each device (Parse and list service information of each devices) (S8100). For example, the control point may receive service information in which the found HDMI devices provide and display a list about the information as a user interface.

Finally, the sink device may transmit detailed information about the second source device collected at steps S8010 and S8020, particularly information about a service in which the second source device can support to the control point instead of the second source device (Notify device information about legacy devices to the control point) (S8110). This step may be performed before step S8100 and therefore service information listed at step S8100 may include service information in which the second source device can support.

Information and message transmitted and received in this flowchart may be transmitted and received in a Uniform Resource Locator (URL) form in which an Extensible Markup Language (XML) based description document is stored. However, at steps S8010 and S8020, a request and response transmitted and received between the sink device and the second source device may have a CEC message form.

FIG. 9 is a flowchart illustrating a method of searching for HDMI device information of a HDMI system and service information in which a HDMI device provides according to an exemplary embodiment of the present invention. In this flowchart, a HDMI system action of the above-described third exemplary embodiment will be described in relation to FIG. 4. Therefore, in this flowchart, source devices are indirectly connected to the sink device through a switch device. Further, this flowchart may be classified into a device discovery method (S9020-S9040) and a service discovery method (S9060 and S9070).

First, both the control point and the HDMI devices (the sink device, the switch device, and a plurality of source devices) may receive an IP address from the AP (IP address allocation (Addressing)) (S9010). In more detail, both the control point and the HDMI devices connected to the same wired and wireless sharer may automatically receive an IPv4 or IPv6 address from a DHCP server.

Thereafter, in order to notify the control point that the HDMI devices are connected to the same network and are available, the HDMI devices advertise (Advertise for each device to inform their existence to Control Point) (S9020). That is, the HDMI devices may perform IP communication to notify the control point of their existence.

Alternatively, instead of step S9020, the control point may directly search for existence of HDMI devices (Search for Control Point to acquire the existence of each device) (S9030). That is, in order to get existence of the HDMI devices connected to the network, the control point may search for the HDMI devices. In this case, the control point may transmit a search message to the HDMI devices with a broadcasting method.

Thereafter, the HDMI devices connected to the same network may notify the control point of their existence (Notify for each device to inform their existence to Control Point) (S9040). In this case, at a previous step, in order to notify their existence, the HDMI devices, having received a search message from the control point may transmit a response message to the search message to the control point.

Thereafter, the control point may analyze (or parse) device information of each HDMI device acquired at step S9020 or S9040 and list device information of discovered devices (Parse and list device information of discovered devices) (S9050). For example, the control point may display a list including the discovered devices as a user interface.

Thereafter, in order to determine detailed information about a service that can be supported by each HDMI device acquired at a previous step S9050, the control point may request detailed information about a service that can be supported by each HDMI device to the each HDMI device (S9060).

Thereafter, the each HDMI device may transmit detailed information (service information) about a service in which the HDMI devices can support to the control point as a response message according to the request of the control point at a previous step (Notify for each device to inform supported services to Control Point) (S9070).

Thereafter, the control point may analyze (or parse) service information received from the each HDMI device and list the found service information of each device (Parse and list service information of each devices) (S9080). For example, the control point may display a list of service information in which the found HDMI devices provide as a user interface.

Information and message transmitted and received in this flowchart may be transmitted and received in a Uniform Resource Locator (URL) form in which an Extensible Markup Language (XML) based description document is stored.

FIG. 10 is a flowchart illustrating a method of searching for HDMI device information of a HDMI system and service information in which a HDMI device provides according to an exemplary embodiment of the present invention. In this flowchart, a HDMI system action of the above-described fourth exemplary embodiment will be described in relation to FIG. 5. Therefore, in this flowchart, the second source device is a legacy HDMI device in which IP communication is unavailable and the switch device (or the sink device) instead of the second source device performs a proxy function of the second source device. Further, in this flowchart, the source devices are indirectly connected to the sink device through the switch device. Further, this flowchart may be classified into a device discovery method (S10040-S10060) and a service discovery method (S10080, S10090, and S10110).

First, the switch device may request detailed information of the second source device that is not connected to an IP network through a non-IP interface (e.g., a HDMI cable) (S10010). Thereafter, the second source device may transmit detailed information thereof (e.g., supportable service information) to the sink device in response to the request of the switch device (S10020). In this case, a request/response transmitted and received between the switch device and the second source device may be transmitted and received as a CEC message through the HDMI cable.

Thereafter, both the control point and HDMI devices (the sink device, the switch device, and the third source device to the N-th source device) that can perform IP communication may receive an IP address from an AP (IP address allocation (Addressing)) (S10030). In more detail, both the control point and the HDMI devices connected to the same wired and wireless sharer may automatically receive an IPv4 or IPv6 address from a DHCP server.

Thereafter, in order to notify the control point that the HDMI devices that can perform IP communication are connected to the same network and are available, the HDMI devices advertise (Advertise for each device to inform their existence to Control Point) (S10040). That is, the HDMI devices may perform IP communication to notify the control point of their existence. In this case, the sink device may notify the control point of existence of the second source device instead of the second source device as well as existence thereof.

Alternatively, instead of step S10040, the control point may search for existence of HDMI devices that can directly perform IP communication (Search for Control Point to acquire the existence of each device) (S10050). That is, in order to get existence of the HDMI devices connected to the network, the control point may directly search for the HDMI devices. In this case, the control point may transmit a search message to the HDMI devices with a broadcasting method.

Thereafter, the HDMI devices (the sink device, the switch device, and the third source device to the N-th source device) connected to the same network may notify the control point of their existence (Notify for each device to inform their existence to Control Point) (S8060). In this case, at a previous step, in order to notify their existence, the HDMI devices, having received a search message from the control point may transmit a response message to the search message to the control point. Particularly, the switch device may transmit a response message for notifying existence of the second source device as well as existence thereof to the control point.

Thereafter, the control point may analyze (or parse) device information of each HDMI device acquired at step S10040 or S10060 and list device information of discovered devices (Parse and list device information of discovered devices) (S10070). For example, the control point may display a list including discovered devices as a user interface.

Thereafter, in order to determine detailed information about a service that can be supported by HDMI devices acquired at the previous step S10070, the control point may request detailed information about a service that can be supported by the HDMI devices to the HDMI devices through an IP network (Request supported services of each device) (S10080).

Thereafter, the HDMI devices that can perform IP communication may transmit detailed information (service information) about a service in which the HDMI devices can support to the control point as a response message according to the request of the control point at a previous step (Notify for each device to inform supported services to Control Point) (S10090). The detailed information about the second source device may be transmitted to the control point by the sink device that performs a proxy function of the second source device and this may be performed at step S10110.

Thereafter, the control point may analyze (or parse) service information received through an IP network from the HDMI devices that can perform IP communication and list the found service information (Parse and list service information of each devices) (S10100). For example, the control point may receive service information in which the found HDMI devices provide and display a list of the information as a user interface.

Finally, the switch device may transmit detailed information about the second source device collected at steps S10010 and S10020, particularly information about a service in which the second source device can support to the control point instead of the second source device (Notify device information about legacy devices to the control point) (S10110). This step may be performed before step S10100 and therefore service information listed at step S10100 may include service information in which the second source device can support.

Information and message transmitted and received in this flowchart may be transmitted and received in a Uniform Resource Locator (URL) form in which an Extensible Markup Language (XML) based description document is stored. However, at steps S10010 and S10020, a request and response transmitted and received between the sink device and the second source device may have a CEC message form.

In this flowchart, an exemplary embodiment is described in which the switch device performs a proxy function, but the present invention is not limited thereto, and the sink device may perform a proxy function of the second source device.

In the foregoing description, a HDMI device connected to an IP network and discovery and search methods of a service in which the HDMI device provides have been described. Hereinafter, connection and connection release methods between HDMI devices using the IP network will be described in detail.

FIG. 11 is a flowchart illustrating connection and connection release methods between HDMI devices according to an exemplary embodiment of the present invention. In this flowchart, a HDMI system action of the above-described first exemplary embodiment will be described in relation to FIG. 2.

First, in order to get a physical address of the sink device from the sink device, the control point may transmit a message that requests the HDMI physical address to the sink device (Get HDMI Physical Address) (S11010). In this case, the control point may transmit a request message to the sink device through an IP network.

Thereafter, the sink device may transmit a HDMI physical address thereof to the control point (Return HDMI Physical Address) (S11020). In more detail, the sink device may transmit a HDMI physical address thereof to the control point through an IP network in response to the request message of the control point received at the previous step S11010.

Thereafter, similarly to step S11010, in order to get a HDMI physical address of each source device (the second source device to the N-th source device), the control point may transmit a message that requests the HDMI physical address to each source device (Get HDMI Physical Address of each source device) (S11030). In this case, the control point may transmit a request message to the source devices through an IP network.

Thereafter, each source device may transmit a HDMI physical address thereof to the control point similarly to step S11020 (Return HDMI Physical Address of each source device) (Return HDMI Physical Address of each source device) (S11040). In more detail, each source device may transmit a HDMI physical address thereof to the control point through an IP network in response to the request message of the control point received at previous step S11030.

Thereafter, the control point may configure HDMI network topology (Configuring the HDMI network topology) (S11050). In more detail, the control point may configure HDMI network topology (configuration form/structure of a network) on a method in which each source device is connected to an input port of the sink device based on a HDMI physical address of HDMI devices acquired at steps S11020 and S11040.

Thereafter, the control point may receive an input that selects the second source device to be connected to the sink device (select to connect the Source Device 2 and the Sink Device) (S11060). For example, the user may perform an input that selects the second source device to be connected to the sink device (or to be displayed in the sink device) through the control point. In order to receive such a user input, the control point may provide a user interface for selecting the source device to be connected to the sink device to the user before step S11060.

Thereafter, the control point may transmit a message that requests connection to the second source device to the sink device such that the second source device selected by the user may be connected to the sink device (Request to connect to source device 2) (S11070). In this case, the control point may transmit a request message to the sink device through the IP network, and the request message includes a HDMI physical address of the second source device.

Thereafter, the sink device may switch an input port thereof to an input port to which the second source device selected by the user is connected (HDMI Port Switching) (S11080). In more detail, by activating the input port to which the second source device selected by the user is connected, the sink device may to be connected to the second source device.

Thereafter, the sink device may transmit an operation result at step S11080 to the control point (Return the result of operation) (S11090). For example, when a connection to the second source device is successfully complete, the sink device may transmit a notification message notifying that a connection to the second source device is complete to the control point. Alternatively, when a connection to the second source device is failed, the sink device may transmit a notification message notifying that a connection to the second source device is failed to the control point.

Finally, a HDMI session between the sink device and the second source device may be opened (HDMI Session between Source Device 2 and Sink Device is opened) (S11100). That is, when the second source device and the sink device are successfully connected, a HDMI session between the sink device and the second source device may be opened. Therefore, various contents stored at the second source device may be provided (or displayed) through the sink device.

FIG. 12 is a flowchart illustrating connection and connection release methods between HDMI devices according to an exemplary embodiment of the present invention. In this flowchart, a HDMI system action of the above-described second exemplary embodiment will be described in relation to FIG. 3. In this flowchart, the second source device is a legacy HDMI device in which IP communication is unavailable and the sink device instead of the second source device may perform a proxy function of the second source device.

First, in order to get a HDMI physical address of the sink device from the sink device, the control point may transmit a message that requests the HDMI physical address to the sink device (Get HDMI Physical Address) (S12010). In this case, the control point may transmit a request message to the sink device through an IP network.

Thereafter, the sink device may transmit a HDMI physical address thereof to the control point (Return HDMI Physical Address) (S12020). In more detail, the sink device may transmit a HDMI physical address thereof to the control point through the IP network in response to the request message of the control point received at the previous step S12010. Further, because the sink device performs a proxy function of the second source device, the sink device may transmit a HDMI physical address of the second source device together with a HDMI physical address thereof to the control point. For this reason, the sink device may previously store a HDMI physical address of the second source device or may separately request a HDMI physical address to the second source device according to a request of the control point according to step S12010.

Thereafter, similarly to step S12010, in order to get a HDMI physical address of each source device (the third source device to the N-th source device), the control point may transmit a message that requests the HDMI physical address to each source device (Get HDMI Physical Address of each source device) (S12030). In this case, the control point may transmit a request message to the source devices that can perform IP communication through the IP network.

Thereafter, each source device that can perform IP communication may transmit a HDMI physical address thereof to the control point similarly to step S12020 (Return HDMI Physical Address of each source device) (S12040). In more detail, each source device that can perform IP communication may transmit a HDMI physical address thereof to the control point through the IP network in response to the request message of the control point received at previous step S12030.

Thereafter, the control point may configure HDMI network topology (S12050). In more detail, the control point may configure HDMI network topology (configuration form/structure of a network) on a method in which each source device is connected to an input port of the sink device based on a HDMI physical address of HDMI devices acquired at steps S12020 and S12040.

Thereafter, the control point may receive an input that selects the second source device to be connected to the sink device (Select to connect Source Device 2 and Sink Device) (S12060). For example, the user may perform an input that selects the second source device to be connected to the sink device (or to be displayed in the sink device) through the control point. In order to receive such a user input, the control point may provide a user interface for selecting the source device to be connected to the sink device to the user before step S12060.

Thereafter, the control point may transmit a message that requests connection to the second source device to the sink device such that the second source device selected by the user may be connected to the sink device (Request to connect to source device 2) (S12070). In this case, the control point may transmit a request message to the sink device through the IP network, and the request message includes a HDMI physical address of the second source device.

Thereafter, the sink device may switch an input port thereof to an input port to which the second source device selected by the user is connected (HDMI Port Switching) (S12080). In more detail, by activating the input port to which the second source device selected by the user is connected, the sink device may to be connected to the second source device.

Thereafter, the sink device may transmit an operation result at step S12080 to the control point (Return the result of operation) (S12090). For example, when a connection to the second source device is successfully complete, the sink device may transmit a notification message notifying that a connection to the second source device is complete to the control point. Alternatively, when a connection to the second source device is failed, the sink device may transmit a notification message notifying that a connection to the second source device is failed to the control point.

Finally, a HDMI session between the sink device and the second source device may be opened (HDMI Session between Source Device 2 and Sink Device is opened) (S12100). That is, when the second source device and the sink device are successfully connected, a HDMI session between the sink device and the second source device may be opened. Therefore, various contents stored at the second source device may be provided (or displayed) through the sink device.

FIG. 13 is a flowchart illustrating connection and connection release methods between HDMI devices according to an exemplary embodiment of the present invention. In this flowchart, a HDMI system action of the above-described third exemplary embodiment will be described in relation to FIG. 4.

First, in order to get a physical address of the sink device from the sink device, the control point may transmit a message that requests a HDMI physical address to the sink device (Get HDMI Physical Address) (S13010). In this case, the control point may transmit a request message to the sink device through an IP network.

Thereafter, the sink device may transmit a HDMI physical address thereof to the control point (Return HDMI Physical Address) (S13020). In more detail, the sink device may transmit a HDMI physical address thereof to the control point through the IP network in response to the request message of the control point received at the previous step S13010.

Thereafter, similarly to steps S13010 and S13020, the control point may transmit a message that requests a HDMI physical address of the switch device and each source device (the second source device to the N-th source device) to the switch device and each source device, and the switch device and the each source device may transmit a HDMI physical address thereof to the control point (Get HDMI Physical Address of Switch and each Source Devices) (S13030). In this case, the control point may transmit a request message to the switch device and the source device through the IP network, and the switch device and the each source device may transmit a HDMI physical address thereof to the control point through the IP network in response to the received request message of the control point.

Thereafter, the control point may configure HDMI network topology (Configuring the HDMI network topology) (S13040). In more detail, the control point may configure HDMI network topology (configuration form/structure of a network) on a method in which each source device is connected to an input port of the sink device and the switch device based on a HDMI physical address of HDMI devices acquired at steps S13020 and S13030.

Thereafter, the control point may receive an input that selects the second source device to be connected to the sink device (Select to connect Source Device 2 and Sink Device) (S13050). For example, the user may perform an input that selects the second source device to be connected to the sink device (or to be displayed in the sink device) through the control point. In order to receive such a user input, the control point may provide a user interface for selecting the source device to be connected to the sink device to the user before step S13050.

Thereafter, the control point may transmit a message that requests connection to the second source device to the switch device such that the second source device selected by the user may be connected to the switch device (Request to connect to source device 2) (S13060). In this case, the control point may transmit a request message to the switch device through the IP network, and the request message may include a HDMI physical address of the second source device.

Thereafter, the switch device may switch an input port thereof to an input port to which the second source device selected by the user is connected (HDMI Port Switching) (S13070). In more detail, by activating the input port to which the second source device selected by the user is connected, the switch device may to be connected to the second source device.

Thereafter, the switch device may transmit an operation result at step S13070 to the control point (Return the result of operation) (S13080). For example, when a connection to the second source device is successfully complete, the switch device may transmit a notification message notifying that a connection to the second source device is complete to the control point. Alternatively, when a connection to the second source device is failed, the switch device may transmit a notification message notifying that a connection to the second source device is failed to the control point.

Thereafter, in order to enable the sink device to switch an input port thereof to an input port connected to the switch device, the control point may transmit a request message to the sink device (Request to connect to the switch device) (S13090). In this case, when the switch device receives a message notifying that a connection to the second source device is "complete" at a previous step, the control point may perform this step.

Thereafter, the sink device may switch an input port thereof to an input port to which the switch device is connected (HDMI Port Switching) (S13100). That is, by activating the input port to which the switch device is connected, the sink device may be connected to the switch device.

Thereafter, the sink device may transmit an operation result at step S13100 to the control point (Request to connect to the switch device) (S13110). For example, when a connection to the switch device is successfully complete, the sink device may transmit a notification message notifying that a connection to the switch device is complete to the control point. Alternatively, when a connection to the switch device is failed, the sink device may transmit a notification message notifying that a connection to the switch device is failed to the control point.

Finally, a HDMI session between the sink device and the second source device may be opened (HDMI Session between Source Device 2 and Sink Device is opened) (S13120). That is, when the second source device and the switch device are successfully connected and when the switch device and the sink device are successfully connected, a HDMI session between the sink device and the second source device may be opened. Therefore, various contents stored at the second source device may be provided (or displayed) through the sink device.

FIG. 14 is a flowchart illustrating connection and connection release methods between HDMI devices according to an exemplary embodiment of the present invention. In this flowchart, a HDMI system action of the above-described fourth exemplary embodiment will be described in relation to FIG. 5. In this flowchart, the second source device is a legacy HDMI device in which IP communication is unavailable and the switch device (or the sink device) instead of the second source device performs a proxy function of the second source device.

First, in order to get a physical address of the sink device from the sink device, the control point may transmit a message that requests a HDMI physical address to the sink device (Get HDMI Physical Address) (S14010). In this case, the control point may transmit a request message to the sink device through an IP network.

Thereafter, the sink device may transmit a HDMI physical address thereof to the control point (Return HDMI Physical Address) (S14020). In more detail, the sink device may transmit a HDMI physical address thereof to the control point through the IP network in response to the request message of the control point received at the previous step S14010.

Thereafter, similarly to steps S14010 and S14020, the control point may request a HDMI physical address of the switch device and each source device (the second source device to the N-th source device) to receive a HDMI physical address of each device from the switch device and each source device (Get HDMI Physical Address of Switch and each Source Devices) (S14030). In this case, because the switch device performs a proxy function of the second source device, the switch device may transmit a HDMI physical address of the second source device together with a HDMI physical address thereof to the control point. For this reason, the switch device may previously store a HDMI physical address of the second source device or may separately request a HDMI physical address of the second source device according to a request of a HDMI physical address of the control point. The control point may transmit a request message to the switch device and the source device through the IP network, the switch device and each source device that can perform IP communication may transmit a HDMI physical address thereof to the control point through the IP network in response to the received request message of the control point.

Thereafter, the control point may configure HDMI network topology (Configuring the HDMI network topology) (S14040). In more detail, the control point may configure HDMI network topology (configuration form/structure of a network) on a method in which each HDMI device is connected to an input port of the sink device and the switch device based on a HDMI physical address of HDMI devices acquired at steps S14020 and S14030.

Thereafter, the control point may receive an input that selects the second source device to be connected to the sink device (S14050). For example, the user may perform an input that selects the second source device to be connected to the sink device (or to be displayed in the sink device) through the control point. In order to receive such a user input, the control point may provide a user interface for selecting the source device to be connected to the sink device to the user before step S14050.

Thereafter, the control point may transmit a message that requests connection to the second source device to the switch device such that the second source device selected by the user may be connected to the switch device (Request to connect to source device 2) (S14060). In this case, the control point may transmit a request message to the switch device through the IP network, and the request message may include a HDMI physical address of the second source device.

Thereafter, the switch device may switch an input port thereof to an input port to which the second source device selected by the user is connected (HDMI Port Switching) (S14070). In more detail, by activating the input port to which the second source device selected by the user is connected, the switch device may to be connected to the second source device.

Thereafter, the switch device may transmit an operation result at step S14070 to the control point (Return the result of operation) (S14080). For example, when a connection to the second source device is successfully complete, the switch device may transmit a notification message notifying that a connection to the second source device is complete to the control point. Alternatively, when a connection to the second source device is failed, the switch device may transmit a notification message notifying that a connection to the second source device is failed to the control point.

Thereafter, the control point may transmit a request message to the sink device in order to switch an input port thereof to an input port in which the sink device is connected to the switch device (Request to connect to the switch device) (S14090). In this case, when the switch device receives a message notifying that a connection to the second source device is "complete" at a previous step, the control point may perform this step.

Thereafter, the sink device may switch an input port thereof to an input port to which the switch device is connected (HDMI Port Switching) (S14100). That is, by activating the input port to which the switch device is connected, the sink device may be connected to the switch device.

Thereafter, the sink device may transmit an action result at step S14100 to the control point (Request to connect to the switch device) (S14110). For example, when a connection to the switch device is successfully complete, the sink device may transmit a notification message notifying that a connection to the switch device is complete to the control point. Alternatively, when a connection to the switch device is failed, the sink device may transmit a notification message notifying that a connection to the switch device is failed to the control point.

Finally, a HDMI session between the sink device and the second source device may be opened (HDMI Session between Source Device 2 and Sink Device is opened) (S14120). That is, when the second source device and the switch device are successfully connected and when the switch device and the sink device are successfully, a HDMI session between the sink device and the second source device may be opened. Therefore, various contents stored at the second source device may be provided (or displayed) through the sink device.

FIG. 15 is a block diagram simply illustrating architecture of a HDMI system. An architecture of the HDMI system that suggests in this specification is formed based on UPnP technology.

A device type of the HDMI system may be classified into a source device, a sink device, and a switch device. Further, a service type in which each device provides may be classified into a proxy service (or legacy discovery service), a control service, a connection management service.

The connection management service can perform IP communication and is a service that manages connection and connection release between IP Control enabled HDMIs through IP communication. The control service is a service that manages the control of a HDMI device that can control through IP communication and a HDMI device (Non-IP Control enabled HDMI) that can control through a Non-IP interface (e.g., a HDMI interface). The legacy discovery service is a service that enables the HDMI device that can control through a Non-IP interface (e.g., a HDMI interface) to discover on an IP network.

Referring to FIG. 15, the source device that can control through IP communication may provide a control service. Further, the switch device that can control through IP communication may provide the entire of a connection management service, a control service, and a legacy discovery service. Further, the sink device that can control through IP communication may also provide the entire of a connection management service, a control service, and a legacy discovery service.

FIG. 16 is a diagram illustrating actions and state variables in a connection management service.

Referring to FIG. 16, the connection management service may provide three actions (or command). In more detail, the connection management service may provide three actions of i) X_HDMIGetPhysicalAddr( ) that reads physical information assigned to the HDMI device, ii) X_HDMIConnectionStart( ) that requests connection to the HDMI device to connect, and iii) X_HDMIConnectionStop( ) that requests connection release to the HDMI device to release connection. Therefore, the HDMI device that provides a connection management service may receive at least one of the three actions and perform a command corresponding to the received action.

Three actions may receive or output HDMIphysicalAddr as an argument, i.e., a physical address of a specific HDMI device. Further, a state variable related to three actions may include X_ARG_TYPE_HDMIPhysicalAddr. The X_ARG_TYPE_HDMIPhysicalAddr may be a state variable representing physical address information assigned to each HDMI device. A data type of such a state variable may be ui4.

A URL name of a connection management service including such three actions and state variable may be variously set according to an exemplary embodiment and may be set to, for example, "urn:hdmi-forum-org:service:ConnectionManagement:1". Therefore, the HDMI device, having received a corresponding URL name may recognize a URL address including a description document of a connection management service defined in a HDMI forum through the corresponding URL name.

FIG. 17 is a diagram illustrating an exemplary embodiment of a description XML document of a connection management service defined in FIG. 16.

Referring to FIG. 17, a description XML document of a connection management service may include a name (X_HDMIGetPhysicalAddr( ), X_HDMIConnectionStart( ), and X_HDMIConnectionStop( )) representing three actions in which a HDMI device can support and include X_ARG_TYPE_HDMIPhysicalAddr as a related state variable.

Therefore, a device, having received a description XML document of a specific HDMI device recognizes that a specific HDMI device is a device that supports the three actions as a connection management service and may transmit a command corresponding thereto. Therefore, a specific HDMI device performs an operation corresponding to the received command.

FIG. 18 is a diagram illustrating an exemplary embodiment of a description XML document of each device transmitted and received at a discovery/search step of a HDMI device.

Referring to FIG. 18, a description XML document of each device may include various information of each device such as performance information, model information, production company information, and icon information of each device, the number of supportable input ports, feature information that can be controlled by CEC, and service URL information.

FIGS. 17 and 18 illustrate an exemplary embodiment of the present invention and the present invention is not limited thereto. Therefore, various forms of description XML documents may be configured.

FIG. 19 is a flowchart illustrating a method of searching for HDMI device information and service information based on UPnP. In this flowchart, it is assumed that the first source device is directly connected to the sink device through a HDMI cable and that the second source device to the N-th source device are indirectly connected to the sink device through the switch device. Further, it is assumed that all HDMI devices (the sink device, the switch device, and the first source device to the N-th source device) can perform IP communication. This flowchart may be classified into a device discovery method (S19020-S19070) and a service discovery method (S19090-S19110).

Referring to FIG. 19, the control point and all HDMI devices may receive an IP address from the AP (S19010). In more detail, both the control point and the HDMI devices connected to the same wired and wireless sharer may automatically receive an IPv4 or IPv6 address from a DHCP server.

Thereafter, in order to notify the control point that each HDMI device is connected to the same network and is available, the each HDMI device may perform advertisement using an SSDP:alive message (S19020). That is, the HDMI devices may perform IP communication to notify the control point of their existence.

Alternatively, instead of step S19020, in order to directly search for existence of the HDMI devices, the control point may search for the HDMI devices using an M-SEARCH message (S19030). That is, in order to get existence of the HDMI devices connected to the network, the control point may directly search for the HDMI devices using the M-SEARCH message. In this case, the control point may transmit a search message to the HDMI devices with a broadcasting method.

Thereafter, the HDMI devices connected to the same network may notify the control point of their existence (S19040). In this case, in order to notify their existence, the HDMI devices, having received the M-SEARCH message at a previous step may transmit a response message to the M-SEARCH message to the control point.

Thereafter, the control point may parse the response message received from the HDMI devices to search for a URL in which a device description document of each HDMI device is stored (S19050).

Thereafter, the control point may request a device description document of each HDMI device through the URL acquired at step S19050 using a HTTP GET method (S19060).

Thereafter, the HDMI devices may transmit a device description document thereof to the control point in response to a request of the control point (S19070). In this case, the transmitted device description document may be transmitted in an XML form of FIG. 18.

Thereafter, the control point may parse a device description document from the HDMI devices to search for an URL in which a service description document of each HDMI device is stored (S19080).

Thereafter, the control point may request a service description document of each HDMI device through a URL acquired through step S19080 using a HTTP GET method (S19090).

Thereafter, the HDMI devices may transmit a service description document thereof as a response message to the request received at step S19090 to the control point (S19100). In this case, the transmitted service description document may be transmitted in an XML form of FIG. 17.

Thereafter, the control point may parse a service description document acquired at step S19100 to extract state variables and actions in which each service supports (S19110).

FIG. 20 is a flowchart illustrating a method of searching for HDMI device information and service information based on UPnP. In this flowchart, it is assumed that the first source device is directly connected to the sink device through a HDMI cable and that the second source device to the N-th source device are indirectly connected to the sink device through the switch device. Further, it is assumed that the third source device cannot perform IP communication and that the remaining HDMI devices (the sink device, the switch device, the second source device, and a fourth source device to the N-th source device), except for the third source device can perform IP communication. This flowchart may be classified into a device discovery method (S20020-S20070) and a service discovery method (S20090-S20110).

Referring to FIG. 20, the control point and HDMI devices that can perform IP communication may receive an IP address from an AP (S20010). In more detail, both the control point and the HDMI devices connected to the same wired and wireless sharer may automatically receive an IPv4 or IPv6 address from a DHCP server. In this case, information about (e.g., performance information, supportable service information) the third source device may be stored in a state variable form at a proxy service in which the switch device and/or the sink device provide(s). Further, in order to enable the third source device to represent on an IP network, the switch device and/or the sink device may represent the third source device on the IP network using a state variable.

Thereafter, in order to notify the control point that each HDMI device that can perform IP communication may be connected to the same network and is available, the each HDMI device may perform advertisement using an SSDP: alive message (S20020). That is, the HDMI devices may perform IP communication to notify the control point of their existence.

Alternatively, instead of step S20020, in order to directly search for existence of HDMI devices connected to an IP network, the control point may search for the HDMI devices using an M-SEARCH message (S20030). That is, in order to get existence of the HDMI devices connected to the IP network, the control point may directly search for the HDMI devices using the M-SEARCH message. In this case, the control point may transmit a search message to the HDMI devices with a broadcasting method.

Thereafter, the HDMI devices connected to the same network may notify the control point of their existence (S20040). In this case, in order to notify their existence, the HDMI devices, having received an M-SEARCH message at the previous step S20030 may transmit a response message to the M-SEARCH message to the control point.

Thereafter, the control point may parse a response message received from the HDMI devices that can perform IP communication to search for an URL in which a device description document of each HDMI device is stored (S20050).

Thereafter, the control point may request a device description document of each HDMI device through an URL acquired at step S20050 using a HTTP GET method (S20060).

Thereafter, the HDMI devices may transmit a device description document thereof to the control point in response to a request of the control point (S20070). In this case, the transmitted device description document may be transmitted in an XML form of FIG. 18.

Thereafter, the control point may parse a device description document from the HDMI devices to search for an URL in which a service description document of each HDMI device is stored (S20080).

Thereafter, the control point may request a service description document of each HDMI device through an URL acquired through step S19080 using a HTTP GET method (S20090).

Thereafter, the HDMI devices may transmit a service description document thereof as a response message to a request received at step S20090 to the control point (S20100). In this case, the transmitted service description document may be transmitted in an XML form of FIG. 17.

Thereafter, the control point may parse the service description document acquired at step S20100 to extract state variables and actions in which each service supports (S20110).

Finally, the switch device may transmit detailed information about the previously collected third source device, particularly information about a service in which the third source device can support to the control point instead of the third source device (S20120).

FIG. 21 is a flowchart illustrating a connection method between HDMI devices based on UPnP of the present invention. In this flowchart, it is assumed that the first source device is directly connected to the sink device through a HDMI cable and that the second source device to the N-th source device are indirectly connected to the sink device through the switch device. Further, it is assumed that all HDMI devices (the sink device, the switch device, and the first source device to the N-th source device) can perform IP communication.

Referring to FIG. 21, in order to get a physical address of the sink device, the control point may transmit (or perform) an X_HDMIGetPhysicalAddr( ) action to the sink device (S21010).

Thereafter, the sink device may transmit a physical address (e.g., 0.0.0.0) thereof to the control point in response to the X_HDMIGetPhysicalAddr( ) action (S21020).

Thereafter, similarly to steps S21010 and S21020, the control point may transmit the X_HDMIGetPhysicalAddr( ) action to the switch device and the source devices to acquire a HDMI physical address of the switch device and the source devices (S21030).

Thereafter, the control point may configure HDMI network topology (configuration form/structure of the network) on a method in which each HDMI device is connected based on a physical address of HDMI devices acquired through the X_HDMIGetPhysicalAddr( ) action (S21040).

Thereafter, the control point may receive a user input that selects the second source device as a source device to be connected to the sink device (or to be displayed in the sink device) (S21050).

Thereafter, the control point may transmit an X_HDMIConnectionStart( ) action to the switch device such that the switch device switches an input port thereof to an input port to which the second source device is connected (S21060). In this case, the control point may transmit a HDMI physical address of the second source device as an input factor of the X_HDMIConnectionStart( ) action.

Thereafter, the switch device may determine a HDMI physical address of the second source device, which is an input factor of the X_HDMIConnectionStart( ) action to activate an input port to which the second source device is connected (S21070).

Thereafter, the switch device may transmit an execution result of the X_HDMIConnectionStart( ) action to the control point (S21080). That is, the switch device may transmit a message on whether a connection to the second source device is successfully performed or failed and a message of a failure reason, if a connection to the second source device is failed, to the control point.

Thereafter, the control point may transmit the X_HDMIConnectionStart( ) action to the sink device such that the sink device switches an input port thereof to an input port to which the switch device is connected (S21090). In this case, the control point may transmit a HDMI physical address of the switch device as an input factor of the X_HDMIConnectionStart( ) action (S21060).

Thereafter, the sink device may determine a HDMI physical address of the switch device, which is an input factor of the X_HDMIConnectionStart( ) action to activate an input port to which the switch device is connected (S21100).

Thereafter, the sink device may transmit an execution result of the X_HDMIConnectionStart( ) action to the control point (S21110). That is, the sink device may transmit a message on whether a connection to the switch device is successfully performed or failed and a message of a failure reason, if a connection to the switch device is failed, to the control point.

Finally, a HDMI session between the sink device and the second source device may be opened (S21120). That is, when the second source device and the switch device are successfully connected and when the switch device and the sink device are successfully connected, a HDMI session between the sink device and the second source device may be opened. Therefore, various contents stored at the second source device may be provided (or displayed) through the sink device.

FIG. 22 is a flowchart illustrating a connection release method between HDMI devices based on UPnP of the present invention. In this flowchart, it is assumed that the first source device is directly connected to the sink device through a HDMI cable and that the second source device to the N-th source device are indirectly connected to the sink device through the switch device. Further, it is assumed that all HDMI devices (the sink device, the switch device, and the first source device to the N-th source device) can perform IP communication. Further, in this flowchart, it is assumed that the second source device is providing HDMI streaming to the sink device.

Referring to FIG. 22, the control point may receive a connection release input between the second source device and the sink device (S22010).

Thereafter, in order to stop HDMI streaming of the second source device, the control point may transmit an X_HDMIConnectionStop( ) action in which a HDMI physical address of the second source device is included as an action factor to the switch device (S22020).

Thereafter, when the switch device determines a HDMI physical address of the second source device, which is an input factor of the X_HDMIConnectionStop( ) action to determine activation of an input port to which the second source device is connected, the switch device may enter a standby mode, waiting mode or a default mode (S22030).

Thereafter, the switch device may transmit an execution result of the X_HDMIConnectionStop( ) action to the control point (S22040). That is, the switch device may transmit a message on whether a connection to the second source device is successfully released or failed and a message of a failure reason, if a connection to the second source device is failed, to the control point.

Thereafter, in order to release connection between the sink device and the switch device, the control point may transmit an X_HDMIConnectionStop( ) action in which a HDMI physical address of the switch device is included as an action factor to the sink device (S22050).

Thereafter, when the sink device determines a HDMI physical address of the switch device, which is an input factor of the X_HDMIConnectionStop( ) action to determine activation of an input port to which the switch device is connected, the sink device may enter a standby mode, waiting mode or default mode (S22060).

Thereafter, the sink device may transmit an execution result of the X_HDMIConnectionStart( ) action to the control point (S22070). That is, the sink device may transmit a message on whether a connection to the switch device is successfully released or failed and a message of a failure reason, if a connection to the switch device is failed, to the control point.

Thereafter, the control point may receive an input that instructs to connect the first source device and the sink device (S22080).

Thereafter, the control point may transmit an X_HDMIConnectionStart( ) action in which a HDMI physical address of the first source device is included as an action factor to the sink device (S22090).

Thereafter, the sink device may determine the HDMI physical address of the first source device, which is an input factor of the X_HDMIConnectionStart( ) action and switch an input port thereof to an input port to which the first source device is connected (or may activate an input port to which the first source device is connected) (S22100).

Thereafter, the sink device may transmit an execution result of the X_HDMIConnectionStart( ) action to the control point (S22110). That is, the sink device may transmit a message on whether a connection to the first source device is successfully performed or failed and a message of a failure reason, if a connection to the first source device is failed, to the control point.

Finally, a HDMI session between the sink device and the first source device may be opened (S22120). That is, when the first source device and the sink device are successfully connected, a HDMI session between the sink device and the first source device may be opened. Therefore, various contents stored at the first source device may be provided (or displayed) through the sink device.

FIG. 23 is a flowchart illustrating a connection method between HDMI devices based on UPnP of the present invention. In this flowchart, it is assumed that the first source device is directly connected to the sink device through a HDMI cable and that the second source device to the N-th source device are indirectly connected to the sink device through the switch device. Further, it is assumed that the third source device cannot perform IP communication and that the remaining HDMI devices, except for the third source device can perform IP communication.

Referring to FIG. 23, in order to get a physical address of the sink device, the control point may transmit (or perform) an X_HDMIGetPhysicalAddr( ) action to the sink device (S23010).

Thereafter, the sink device may transmit a physical address (e.g., 0.0.0.0) thereof to the control point in response to the X_HDMIGetPhysicalAddr( ) action (S23020).

Thereafter, similarly to steps S23010 and S23020, the control point may transmit the X_HDMIGetPhysicalAddr( ) action to the switch device and the source devices to acquire HDMI physical addresses of the switch device and the source devices (S23030). In this case, the switch device (or the sink device) may perform a proxy function of the third source device to transmit a HDMI physical address of the third source device to the control point instead of the third source device.

Thereafter, the control point may configure HDMI network topology (configuration form/structure of the network) on a method in which each HDMI device is connected based on a physical address of HDMI devices acquired through the X_HDMIGetPhysicalAddr( ) action (S23040).

Thereafter, the control point may receive a user input that selects the third source device as a source device to be connected to the sink device (or to be displayed in the sink device) (S23050).

Thereafter, the control point may transmit an X_HDMIConnectionStart( ) action to the switch device such that the switch device switches an input port thereof to an input port to which the third source device is connected (S23060). In this case, the control point may transmit a HDMI physical address of the third source device as an input factor of the X_HDMIConnectionStart( ) action.

Thereafter, the switch device may determine a HDMI physical address of the third source device, which is an input factor of the X_HDMIConnectionStart( ) action to activate an input port to which the third source device is connected (S23070).

Thereafter, the switch device may transmit an execution result of the X_HDMIConnectionStop( ) action to the control point (S23080). That is, the switch device may transmit a message on whether a connection to the second source device is successfully performed or failed and a message of a failure reason, if a connection to the second source device is failed, to the control point.

Thereafter, the control point may transmit the X_HDMIConnectionStart( ) action to the sink device such that the sink device switches an input port thereof to an input port to which the switch device is connected (S23090). In this case, the control point may transmit a HDMI physical address of the switch device as an input factor of the X_HDMIConnectionStart( ) action.

Thereafter, the sink device may determine a HDMI physical address of the switch device, which is an input factor of the X_HDMIConnectionStart( ) action to activate an input port to which the switch device is connected (S23100).

Thereafter, the sink device may transmit an execution result of the X_HDMIConnectionStart( ) action to the control point (S23110). That is, the sink device may transmit a message on whether a connection to the switch device is successfully performed or failed and a message of a failure reason, if a connection to the switch device is failed, to the control point.

Finally, a HDMI session between the sink device and the third source device may be opened (S23120). That is, when the second source device and the switch device are successfully connected and when the switch device and the sink device are successfully connected, a HDMI session between the sink device and the third source device may be opened. Therefore, various contents stored at the third source device may be provided (or displayed) through the sink device.

FIG. 24 is a flowchart illustrating a connection release method between HDMI devices based on UPnP of the present invention. In this flowchart, it is assumed that the first source device is directly connected to the sink device through a HDMI cable and that the second source device to the N-th source device are indirectly connected to the sink device through the switch device. Further, it is assumed that a third source device cannot perform IP communication and that the remaining HDMI devices, except for the third source device can perform IP communication. Further, in this flowchart, it is assumed that the third source device is providing HDMI streaming to the sink device.

Referring to FIG. 24, in order to stop HDMI streaming of the third source device, the control point may transmit an X_HDMIConnectionStop( ) action in which a HDMI physical address of the third source device is included as an action factor to the switch device (S24010).

Thereafter, when the switch device determines the HDMI physical address of the third source device, which is an input factor of the X_HDMIConnectionStop( ) action to determine activation of an input port to which the third source device is connected, the switch device may enter a standby mode, waiting mode or default mode (S24020).

Thereafter, the switch device may transmit an execution result of the X_HDMIConnectionStop( ) action to the control point (S24030). That is, the switch device may transmit a message on whether a connection to the third source device is successfully released or failed and a message of a failure reason, if a connection to the third source device is failed, to the control point.

Thereafter, in order to release connection between the sink device and the switch device, the control point may transmit an X_HDMIConnectionStop( ) action in which the HDMI physical address of the switch device is included as an action factor to the sink device (S24040).

Thereafter, when the sink device determines the HDMI physical address of the switch device, which is an input factor of the X_HDMIConnectionStop( ) action to determine activation of an input port to which the switch device is connected, the sink device may enter a standby mode, waiting mode or a default mode (S24050).

Thereafter, the sink device may transmit an execution result of the X_HDMIConnectionStop( ) action to the control point (S24060). That is, the sink device may transmit a message on whether a connection to the switch device is successfully released or failed and a message of a failure reason, if a connection to the switch device is failed, to the control point.

Thereafter, the control point may receive an input that instructs to connect the first source device and the sink device (S24070).

Thereafter, the control point may transmit an X_HDMIConnectionStart( ) action in which the HDMI physical address of the first source device is included as an action factor to the sink device (S24080).

Thereafter, the sink device may determine a HDMI physical address of the first source device, which is an input factor of the X_HDMIConnectionStart( ) action and switch an input port thereof to an input port to which the first source device is connected (or may activate an input port to which the first source device is connected) (S24090).

Thereafter, the sink device may transmit an execution result of the X_HDMIConnectionStart( ) action to the control point (S24100). That is, the sink device may transmit a message on whether a connection to the first source device is successfully performed or failed and a message of a failure reason, if a connection to the first source device is failed, to the control point.

Finally, a HDMI session between the sink device and the first source device may be opened (S24110). That is, when the first source device and the sink device are successfully connected, a HDMI session between the sink device and the first source device may be opened. Therefore, various contents stored at the first source device may be provided (or displayed) through the sink device.

In the foregoing description, a method of searching for and connecting HDMI devices and releasing connection of HDMI devices using IP communication has been described in detail. Order of each step included in the flowchart of this specification may be changed according to an exemplary embodiment, and a new step may be added to the flowchart or some step may be excluded from the flowchart. Further, a description on a specific flowchart may be equally/similarly applied to a flowchart of a corresponding exemplary embodiment. Hereinafter, a summary of the foregoing exemplary embodiments will be described.

1. Method of Searching for HDMI Device Information and Service Using an IP Network In order to enable HDMI devices connected to the IP network to be discovered by the control point that belongs to the same IP network, the HDMI devices themselves may perform advertisement or may be discovered by the control point in response to a device discovery search request of the control point. In order to obtain device information (e.g., HDMI version, a supportable service) of the discovered HDMI devices, the control point requests a device description document in which device information is loaded, and the discovered HDMI devices transmit a device information description document in response thereto. The control point analyzes the received device information description document to determine a service in which the device can support and requests detailed information (e.g., an operable action and a state variable) about each service to the each device. Each HDMI device transmits a service description document in response thereto to the control point. A HDMI device having no interface that may be connected to the IP network may be discovered by the control point through a HDMI device that may be connected to the IP network.

2. Method of Performing Connection and Connection Release Between HDMI Devices Using an IP Network In order for a HDMI source device selected by the user to transmit video and audio to a HDMI sink device, the control point collects a HDMI physical address of each HDMI device from the each HDMI device. When the HDMI source device is directly connected to the HDMI sink device, the control point transmits a physical address of the HDMI source device selected by the user together with a connection command to the HDMI sink device. As the HDMI sink device switches an input port thereof to an input port corresponding to the received physical address, in the HDMI source device selected by the user, a physical path that can receive video and audio is in an opened state. When the HDMI source device is indirectly connected through a switch or a device that performs a repeater function, the control point transmits a physical address of the HDMI source device selected by the user together with a connection command to the switch device or the device that performs a repeater function. Further, the control point transfers a physical address of the switch or the device that performs a repeater function together with a connection command to the HDMI sink device. The devices, having received the physical address switch an input port thereof to an input port corresponding to the received physical address and thus a physical path that can transmit video and audio from the HDMI source device selected by the user to the HDMI sink device is in an open state. In a connection release method, by transmitting a physical address of a corresponding HDMI device (a source device, a switch device or a device that performs a repeater function) together with a connection release command to the HDMI device (a sink device, a switch device or a device that performs a repeater function) to be a switch subject of an input port, an open physical path may be closed and another physical path may be opened.

Although the present invention has been described by separate drawings for the convenience of description, it is also possible to design so as to implement a new embodiment by merging the embodiments described for each drawing. In addition, the construction and method of the embodiments described above are not limitedly applied to the display device, but a part or the whole of the embodiments may be selectively combined and constructed so as to implement various modifications.

While the preferred embodiments have been particularly shown and described, the present specification shall not be limited to the particular embodiments described above, and it will be understood by an ordinary skilled person in the art that various changes in form and details may be made therein without departing from the spirit and scope of the present invention as defined by the following claims, and the alternative embodiments should not be individually understood from the inventive concept and prospect of the present invention.

MODE FOR INVENTION

Various embodiments are described as a preferred form to implement the present invention.

INDUSTRIAL APPLICABILITY

The present invention is used in a series of HDMI fields

It will be understood to those skilled in the art that various modifications and variations can be made in the present invention described so far, without departing from the spirit or scope of the inventions. Therefore, the present invention is intended to include modifications and variations of the present invention provided by the attached claims and the equivalence.

The invention claimed is:

1. A method of transmitting and receiving data of a sink device connected to a plurality of source devices using a High Definition Multimedia Interface (HDMI), the method comprising:
    receiving allocation of an Internet Protocol (IP) address;
    transmitting, through an IP-based network, device information about the sink device to a control point,
    wherein the control point is a device controlling the sink device and the plurality of source devices through the IP-based network by configuring an HDMI network topology;
    transmitting, through the IP-based network, service information about a supportable service by the sink device to the control point; and
    when a first source device of the plurality of source devices is not connected to the IP-based network:
        transmitting, through the HDMI, a request message that requests device information about the first source device and service information about a supportable service by the first source device;
        receiving, through the HDMI, a response message including the device information and the service information of the first source device from the first source device; and
        transmitting, through the IP-based network, the device information and the service information of the first source device to the control point instead of the first source device.

2. The method of claim 1, wherein the response message including the device information and the service information of the first source device is received in a Consumer Electronic Control (CEC) message form.

3. The method of claim 1, further comprising transmitting an HDMI physical address of the sink device to the control point through the network.

4. The method of claim 3, wherein, when the first source device of the plurality of source devices is not connected to the IP-based network, the transmitting of an HDMI physical address comprises additionally transmitting an HDMI physical address of the first source device with an HDMI physical address of the sink device to the control point through the IP-based network instead of the first source device.

5. The method of claim 3, further comprising:
    receiving, through the IP-based network, a connection request to a specific source device of a plurality of source devices from the control point;
    activating an input port to which the specific source device is connected; and
    receiving, through the HDMI, video and/or audio data from the specific source device.

6. The method of claim 5, further comprising:
    receiving, through the IP-based network, a connection release request to the specific source device from the control point; and
    deactivating the input port to which the specific source device is connected.

7. The method of claim 3, further comprising:
    when the sink device is indirectly connected to the plurality of source devices through a switch device:
    receiving, through the IP-based network, a connection request to the switch device to which a specific source device of the plurality of source devices is connected from the control point;
    activating an input port to which the switch device is connected; and
    receiving, through the HDMI, video and/or audio data from the specific source device through the switch device.

8. The method of claim 7, further comprising:
    receiving, through the IP-based network, a connection release request to the switch device from the control point; and
    deactivating the input port to which the switch device is connected.

9. The method of claim 1, wherein the device information and the service information of the sink device is transmitted in a Uniform Resource Locator (URL) form in which an Extensible Markup Language (XML) based description document is stored.

10. A sink device connected to a plurality of source devices using a High Definition Multimedia Interface (HDMI), the sink device comprising:
    a HDMI transmission unit configured to transmit and receive data through the HDMI;
    a network interface configured to perform communication with another device; and
    a control unit configured to control the HDMI transmission unit and the network interface,
    wherein the control unit is further configured to:
        receive allocation of an Internet Protocol (IP) address, transmit, through an IP-based network, device information about the sink device to a control in point, wherein the control point is a device controlling the sink device and the plurality of source devices through the IP-based network by configuring an HDMI network topology, transmit, through the IP-based network, service information about a supportable service by the sink device to the control point, and when a first source device of the plurality of source devices is not connected to the IP-based network:
- transmit, through the HDMI, a request message that requests device information about the first source device and service information about a supportable service by the first source device,
- receive, through the HDMI, a response message including the device information and the service information of the first source device from the first source device, and
- transmit, through the IP-based network, the device information and the service information of the first source device to the control point instead of the first source device.

11. The sink device of claim 10, wherein the device information and the service information of the sink device is transmitted in a Uniform Resource Locator (URL) form in which an Extensible Markup Language (XML) based description document is stored.

* * * * *